US011656750B2

(12) United States Patent
Li et al.

(10) Patent No.: US 11,656,750 B2
(45) Date of Patent: May 23, 2023

(54) METHOD AND DEVICE FOR REFERENCE-DIAGRAM EDITING FOR CHART AND NON-TRANSITORY COMPUTER-READABLE STORAGE MEDIUM

(71) Applicant: Shenzhen Futu Network Technology Co., Ltd., Guangdong (CN)

(72) Inventors: Hua Li, Guangdong (CN); Zheng Pei, Guangdong (CN)

(73) Assignee: Shenzhen Futu Network Technology Co., Ltd., Guangdong (CN)

( * ) Notice: Subject to any disclaimer, the term of this patent is extended or adjusted under 35 U.S.C. 154(b) by 0 days.

(21) Appl. No.: 17/547,897

(22) Filed: Dec. 10, 2021

(65) Prior Publication Data

US 2022/0100360 A1   Mar. 31, 2022

Related U.S. Application Data

(63) Continuation of application No. PCT/CN2021/082443, filed on Mar. 23, 2021.

(30) Foreign Application Priority Data

Mar. 23, 2020   (CN) .......................... 202010209012.0

(51) Int. Cl.
  *G06F 3/048*   (2013.01)
  *G06F 3/04845*   (2022.01)
  *G06F 3/04883*   (2022.01)

(52) U.S. Cl.
  CPC ...... *G06F 3/04845* (2013.01); *G06F 3/04883* (2013.01)

(58) Field of Classification Search
  CPC ..... G06F 3/04845; G06F 3/0488; G06F 3/016
  See application file for complete search history.

(56) References Cited

U.S. PATENT DOCUMENTS 5,588,108 A  * 12/1996 Kumar ................. G06T 11/206
                                                      715/765
5,982,383 A  * 11/1999 Kumar ................ G06F 3/04845
                                                      345/440

(Continued)

FOREIGN PATENT DOCUMENTS

CN       102737344 A     10/2012
CN       105068727 A     11/2015
(Continued)

OTHER PUBLICATIONS

Ren et al., Charticulator_Interactive_Construction_of_Bespoke_Chart_Layouts, 2019, IEEE. 11 pages.*

(Continued)

*Primary Examiner* — Linh K Pham
(74) *Attorney, Agent, or Firm* — IP Spring

(57) ABSTRACT

A method and a device for reference-diagram editing for a chart, and a non-transitory computer-readable storage medium are provided. The method is performed by a mobile terminal and includes, during display of a chart: detecting whether a chart operation object is selected; switching the chart to an editable state in response to detecting that the chart operation object is selected; detecting preset edit-touch events in a control region of an edit page corresponding to the chart after switching the chart to the editable state, where the edit page includes the control region and the chart, and the control region coincides with a region where a main chart of the chart is located; performing a reference-diagram editing operation on the main chart of the chart according to the edit-touch events detected in the control region of the edit page to edit a reference diagram on the main chart.

20 Claims, 15 Drawing Sheets

(56) References Cited

U.S. PATENT DOCUMENTS

| | | | |
|---|---|---|---|
| 9,270,728 B2* | 2/2016 | Duncker | G06F 40/186 |
| 10,789,261 B1* | 9/2020 | Nguyen | G06F 16/282 |
| 2006/0061779 A1* | 3/2006 | Chen | G06F 3/0488 |
| | | | 358/1.8 |
| 2012/0271748 A1* | 10/2012 | DiSalvo | G06Q 40/04 |
| | | | 705/37 |
| 2013/0097177 A1* | 4/2013 | Fan | G06F 40/18 |
| | | | 707/805 |
| 2014/0351725 A1 | 11/2014 | Kim et al. | |
| 2015/0015504 A1* | 1/2015 | Lee | G06T 11/206 |
| | | | 345/173 |
| 2015/0067568 A1* | 3/2015 | Lee | G06F 3/0482 |
| | | | 715/771 |
| 2016/0055659 A1* | 2/2016 | Wilson | G06F 3/04842 |
| | | | 345/440 |
| 2018/0359425 A1* | 12/2018 | Hiro | H04N 23/631 |
| 2019/0065014 A1* | 2/2019 | Richter | G06T 11/60 |
| 2020/0004412 A1* | 1/2020 | Ahuja | G06F 3/04883 |
| 2020/0142658 A1* | 5/2020 | Prakash | G06F 16/2474 |

FOREIGN PATENT DOCUMENTS

| | | |
|---|---|---|
| CN | 106447494 A | 2/2017 |
| CN | 107845036 A | 3/2018 |
| CN | 108255800 A | 7/2018 |
| CN | 111475094 A | 7/2020 |

OTHER PUBLICATIONS

Park et al., A Notebook Format for the Holistic Design of Embedded Systems (Tool Paper), 2018, arXiv, 10 pages.*

CNIPA, International Search Report for International Patent Application No. PCT/CN2021/082443, dated Jun. 29, 2021, 4 pages.

CNIPA, First Office Action for Chinese Patent Application No. CN202010209012.0, dated Mar. 25, 2021, 13 pages.

«http://www.360doc.com/content/19/0624/09/25708565», drawing methods and instructions of K line, Jun. 24, 2019 (Jun. 24, 2019), pp. 1-33.

CNIPA, First Search for Chinese Patent Application No. CN202010209012.0, dated Mar. 17, 2021, 2 pages.

* cited by examiner

METHOD AND DEVICE FOR REFERENCE-DIAGRAM EDITING FOR CHART AND NON-TRANSITORY COMPUTER-READABLE STORAGE MEDIUM

CROSS-REFERENCE TO RELATED APPLICATION(S)

This application is a continuation under 35 U.S.C. § 120 of International Application No. PCT/CN2021/082443, filed on Mar. 23, 2021, which claims priority under 35 U.S.C. § 119(a) and/or PCT Article 8 to Chinese Patent Application No. 202010209012.0, filed on Mar. 23, 2020, the entire disclosures of which are hereby incorporated by reference.

TECHNICAL FIELD

This disclosure relates to the field of computer technology, and more particularly to a method and a device for reference-diagram editing for a chart and a non-transitory computer-readable storage medium.

BACKGROUND

At present, to facilitate users to view the financial market at any time, financial market software that can be run on mobile terminals has been developed. By using the financial market software, price trend charts of stocks, options, and so on can be viewed, and the user can analyze price trend according to the price trend charts.

However, the existing financial market software of the mobile terminal can merely display the price trend chart, and the price trend analysis needs to be completed by the user. However, it is inconvenient for the user to analyze the price trend according to the price trend chart. Although the user can observe the price trend chart with eyes of the user and analyze the price trend, analysis results obtained in this way are not accurate. Alternatively, the user can take a screenshot of the price trend chart and print it out, and then analyze the price trend by manually drawing a reference diagram on the price trend chart, but this way is tedious.

SUMMARY

Implementations of the disclosure provide a method for reference-diagram editing for a chart, which is performed by a mobile terminal. The method includes the following. During display of a chart, detect whether a chart operation object is selected. When the chart operation object is selected, the chart is switched to an editable state. After the chart is switched to the editable state, detect edit-touch events in a control region of an edit page corresponding to the chart, where the edit page includes the chart, and the control region coincides with a region where a main chart of the chart. Multiple line drawing types are preset in the edit page and are classified into multi-grade types. The multi-grade types include a first grade type and as a parent type and a second grade type as a child type of the first grade type. The first grade type includes a polygon type, and the second grade type of the polygon type includes triangle, rectangle, parallelogram, circle, and ellipse. A reference-diagram editing operation is performed on the main chart according to the edit-touch events detected. The method further includes the following after switching the chart to the editable state and prior to detecting the edit-touch events in the control region of the edit page. Detect in the edit page whether a line drawing type in the multiple line drawing types is selected. When the line drawing type is selected, a total anchor number corresponding to the line drawing type selected is determined.

Implementations of the disclosure provide a device for reference-diagram editing for a chart. The device includes a processor and a memory. The memory is configured to store a computer program. The computer program, when executed by the processor, causes the processor to perform the following. During display of a chart, detect whether a chart operation object is selected. When the chart operation object is selected, the chart is switched to an editable state. After the chart is switched to the editable state, detect edit-touch events in a control region of an edit page corresponding to the chart, where the edit page includes the chart, and the control region coincides with a region where a main chart of the chart. Multiple line drawing types are preset in the edit page and are classified into multi-grade types. The multi-grade types include a first grade type as a parent type and a second grade type as a child type of the first grade type. The first grade type includes a polygon type, and the second grade type of the polygon type includes triangle, rectangle, parallelogram, circle, and ellipse. A reference-diagram editing operation is performed on the main chart according to the edit-touch events detected. The computer program, when executed by the processor, further causes the processor to perform the following after switching the chart to the editable state and prior to detecting the edit-touch events in the control region of the edit page. Detect in the edit page whether a line drawing type in the multiple line drawing types is selected. When the line drawing type is selected, a total anchor number corresponding to the line drawing type selected is determined.

Implementations of the disclosure provide a non-transitory computer-readable storage medium. The non-transitory computer-readable storage medium stores computer programs. The computer programs, when executed by a processor, cause the processor to perform the following. During display of a chart, detect whether a chart operation object is selected. When the chart operation object is selected, the chart is switched to an editable state. After the chart is switched to the editable state, detect edit-touch events in a control region of an edit page corresponding to the chart, where the edit page includes the chart and the control region coincides with a region where a main chart of the chart. Multiple line drawing types are preset in the edit page and are classified into multi-grade types. The multi-grade types include a first grade type as a parent type and a second grade type as a child type of the first grade type. The first grade type includes a polygon type, and the second grade type of the polygon type includes triangle, rectangle, parallelogram, circle, and ellipse. A reference-diagram editing operation is performed on the main chart according to the edit-touch events detected. The computer programs, when executed by the processor, further cause the processor to perform the following after switching the chart to the editable state and prior to detecting the edit-touch events in the control region of the edit page. Detect in the edit page whether a line drawing type in the multiple line drawing types is selected. When the line drawing type is selected, a total anchor number corresponding to the line drawing type selected is determined.

BRIEF DESCRIPTION OF THE DRAWINGS

The accompanying drawings illustrated herein are intended to provide a further understanding of the disclosure and constitute a part of the disclosure. The exemplary implementations of the disclosure and description thereof are used for explaining the disclosure and not used for limiting the disclosure.

DETAILED DESCRIPTION

To describe objects, technical solutions, and advantages of the disclosure more clearly, the following will give a detailed description of implementations of the disclosure in conjunction with accompanying drawings.

Figure 1:
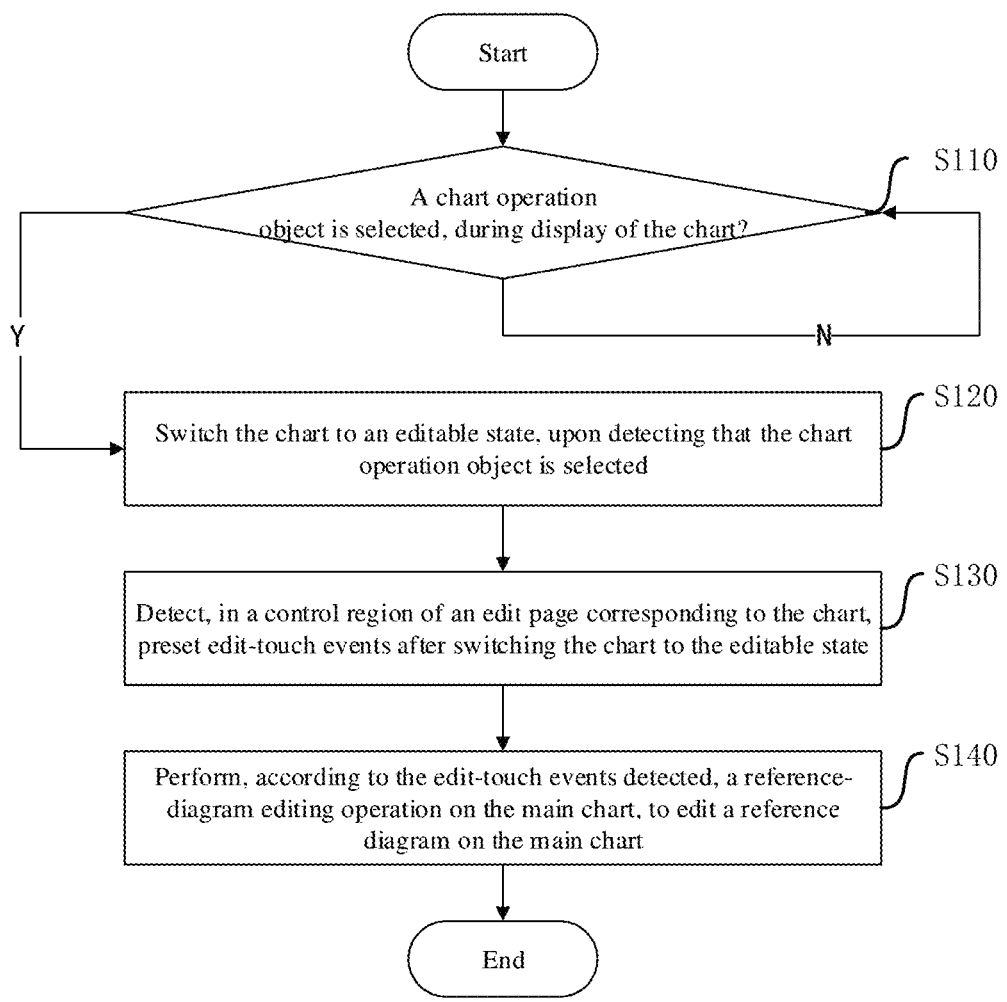
FIG. 1 is a flow chart illustrating a method for reference-diagram editing for a chart according to implementations of the disclosure.

Implementations of the disclosure provide a method for reference-diagram editing for a chart. FIG. 1 is a flow chart illustrating a method for reference-diagram editing for a chart according to implementations of the disclosure.

At S110, detect whether a chart operation object is selected, during display of the chart. If the chart operation object is selected, the method proceeds to an operation at S120; otherwise, the method proceeds to the operation at S110, i.e., continue detecting whether the chart operation object is selected.

The chart includes but is not limited to a main chart, a secondary chart, and chart information.

The main chart refers to a price trend chart corresponding to a chart body. The chart body is a main body to which the price trend chart belongs. The chart body is, for example, a company. The types of the price trend chart include, but are not limited to, underlying stocks, options, and indexes. The price trend chart includes but is not limited to a time-sharing chart, a daily K-line chart, a weekly K-line chart, a monthly K-line chart, a quarterly K-line chart, or an annual K-line chart.

The secondary chart refers to an indicator line of the chart. The indicator line is a change rate, a capacity indicator, a trend indicator, and the like for example.

The chart information includes but is not limited to a name of the chart body, transaction status of the chart body, and transaction information of the chart body. The transaction status includes but is not limited to: trading hours and non-trading hours. The transaction information includes but is not limited to opening price, closing price, trading volume, and trading turnover.

The chart operation object includes but is not limited to a chart edit entry and a reference diagram created on the main chart.

The chart edit entry refers to an entry button used for switching the chart to an editable state. The chart edit entry can be provided in a first edit page and/or a second edit page corresponding to the chart. The first edit page may be a quotation page (portrait-screen display page) including the chart. The second edit page may be a landscape-screen display page including at least the main chart.

The reference diagram is a diagram created on the main chart. Creating the reference diagram on the main chart can be used to analyze a shape of the main chart, so as to determine a current state and a subsequent trend of the main chart.

At S120, if the chart operation object is selected, the chart is switched to the editable state.

The state of the chart includes the editable state and a non-editable state. When the chart is in the editable state, it means that a reference diagram can be edited in the main chart. When the chart is in the non-editable state, it means that editing of a reference diagram is not allowed in the main chart. Editing a reference diagram includes creating, modifying, and/or deleting the reference diagram.

If the reference diagram created on the main chart is selected, the chart is switched to the editable state, i.e., modifying and deleting of the reference diagram are allowed. Furthermore, when the reference diagram created on the main chart is selected, the chart is switched to the editable state as follows. The reference diagram selected in the main chart is switched to a selected state.

If the chart edit entry is selected, the chart is switched to the editable state, i.e., creating, modifying, and deleting a reference diagram on the main chart are allowed.

Furthermore, if the chart edit entry is selected, the second edit page is displayed, the chart is switched to the editable state in the second edit page, and a reference diagram is allowed to be created, modified, or deleted on the main chart of the second edit page. If the chart edit entry is closed, the chart is switched from the editable state to the non-editable state, and a page before the chart edit entry is selected is restored. As an example, if the chart edit entry is selected in the second edit page, display of the second edit page is maintained. If the chart edit entry is selected in the first edit page, switch from the first edit page to the second edit page, and the first edit page is restored after the chart edit entry is closed.

At S130, after the chart is switched to the editable state, preset edit-touch events are detected in a control region of an edit page corresponding to the chart.

The edit page shows the chart. The edit page includes the control region and the chart, and the control region is a region where the main chart of the chart is located. The edit page includes the first edit page and the second edit page. The control region refers to a region used for detecting the edit-touch events for editing the reference diagram. The edit-touch events include but are not limited to: a touch-down event, a touch-move event, and a touch-up event. The touch-down event is an event that occurs when a finger of a user touches a screen of a mobile terminal. The touch-move event is an event that occurs when the finger of the user moves (drags) on the screen of the mobile terminal. The touch-up event is an event that occurs when the finger of the user leaves the screen of the mobile terminal.

When the finger of the user touches the screen of the mobile terminal, the mobile terminal can detect a touch event and determine whether the touch event occurs in the control region according to a position where the touch event occurs. If the touch event occurs in the control region, and the touch event is the touch-down event, the touch-move event, or the touch-up event, it is considered that the edit-touch event is detected.

At S140, a reference-diagram editing operation is performed on the main chart according to the edit-touch events detected, to edit a reference diagram on the main chart.

The reference-diagram editing operation includes a reference-diagram creating operation, a reference-diagram modifying operation, and/or a reference-diagram deleting operation.

The reference-diagram creating operation refers to creating a reference diagram on the main chart according to the edit-touch events detected in the control region of the edit page.

The reference-diagram modifying operation refers to modifying a position, an attribute, and/or a shape of a reference diagram already created on the main chart according to the edit-touch events detected in the control region of the edit page.

The reference-diagram deleting operation refers to deleting a reference diagram already created on the main chart according to the edit-touch events detected in the control region of the edit page.

A reference-diagram editing instruction can be provided before the reference-diagram editing operation is performed on the main chart. The reference-diagram editing instruction describes how to create, modify, and delete the reference diagram. Upon detecting that an instruction display button is selected, jump to a page for displaying the reference-diagram editing instruction, and after the page for displaying the reference-diagram editing instruction is closed, return to a page before the jump. The page for displaying the reference-diagram editing instruction may be an H5 page. H5 is short for HTML (hypertext markup language) 5, i.e., HTML 5.0.

Since the main chart needs to be updated every preset time period, in order not to affect the accuracy of the main chart, the main chart can be continuously updated according to an update cycle of the main chart during performing of the reference-diagram editing operation on the main chart.

If the chart edit entry is selected in the first edit page, switch to the second edit page from the first edit page, and then the reference diagram can be edited in the second edit page. After the chart edit entry is closed, the first edit page is restored. Thereafter, in the first edit page, the main chart with or without the edited reference diagram can be illustrated. If the main chart with the edited reference diagram is illustrated in the first edit page, after the edited reference diagram is selected, display of the edited reference diagram can be maintained in the first edit page, and then the reference diagram can be modified or deleted in the first edit page.

After the reference-diagram editing operation is performed on the main chart, an editing result can be stored in a local storage or uploaded to a background server. When it is necessary to display the chart again, the editing result can be obtained from the local storage or from the background server, and the edited reference diagram can be displayed in the main chart according to the editing result. As an example, if a reference diagram was created last time, the reference diagram created last time can be displayed on the main chart while the main chart is viewed this time. Alternatively, if a color of the reference diagram was modified last time, the reference diagram subject to color modifying can be displayed on the main chart while the main chart is viewed this time. Alternatively, if the reference diagram was deleted last time, the main chart without the reference diagram is displayed this time. Furthermore, as an optional implementation, after the reference-diagram editing operation is performed on the main chart, the editing result is uploaded to the background server, to synchronize the editing result between different mobile terminals.

In order to facilitate the user to view the main chart, a reference diagram hide button and a reference diagram display button can be provided in the edit page. When the reference diagram hide button is selected, the reference diagram edited in the main chart is hidden. When the reference diagram display button is selected, the reference diagram edited in the main chart is displayed. Furthermore, the reference diagram display button is selected by default.

To facilitate the user to analyze the main chart, the edit page can support display of a line drawing toolbar, zoom-in and/or zoom-out operations of the chart, chip distribution, cross-shaped mark, setting of buying and selling labels, setting of custom label, display of cost line, display of transaction details, and other functions. The line drawing toolbar is a tool used to edit a reference diagram on the main chart. The line drawing toolbar at least includes multiple line drawing types and multiple attribute modify options. The line drawing toolbar includes two parts separately displayed, i.e., the multiple line drawing types and multiple attribute modify options are separately displayed. After the chart edit entry is selected or the reference diagram already created on the main chart is selected, the line drawing toolbar can be displayed in the edit page. When the line drawing toolbar is closed, i.e., when the edit page is closed or the chart edit entry is closed, the line drawing toolbar is not displayed. During performing of the reference-diagram editing operation on the main chart, use of the cross-shaped mark, zoom in or zoom out of the main chart, switching of the chart body, and switching of the update cycle of the main chart are not allowed.

After the chart edit entry is selected, in the control region, the reference-diagram editing operation can be performed on the main chart by means of touch operation. According to the implementations of the disclosure, not only can the chart be displayed, but the reference-diagram editing operation can be performed on the main chart by means of the touch operation while the chart is displayed, so that the user can analyze the price trend of the main chart according to the reference diagram edited on the main chart.

The following further describes setting of the chart edit entry.

The chart edit entry can be implemented as a virtual button and/or physical button.

If the chart edit entry is a physical button, the chart edit entry can be realized by using existing physical keys of the mobile terminal. For example, during display of the chart, pressing a HOME key for a preset time indicates that the chart edit entry is selected.

If the chart edit entry is a virtual button, the chart edit entry can be provided in the first edit page and/or the second edit page. For example, the first edit page is a quotation page (portrait-screen display page) including the chart. The second edit page is a landscape-screen display page including at least the main chart.

Figure 2:
FIG. 2 is a schematic diagram illustrating a chart edit entry in a quotation page according to implementations of the disclosure.
Figure 3:
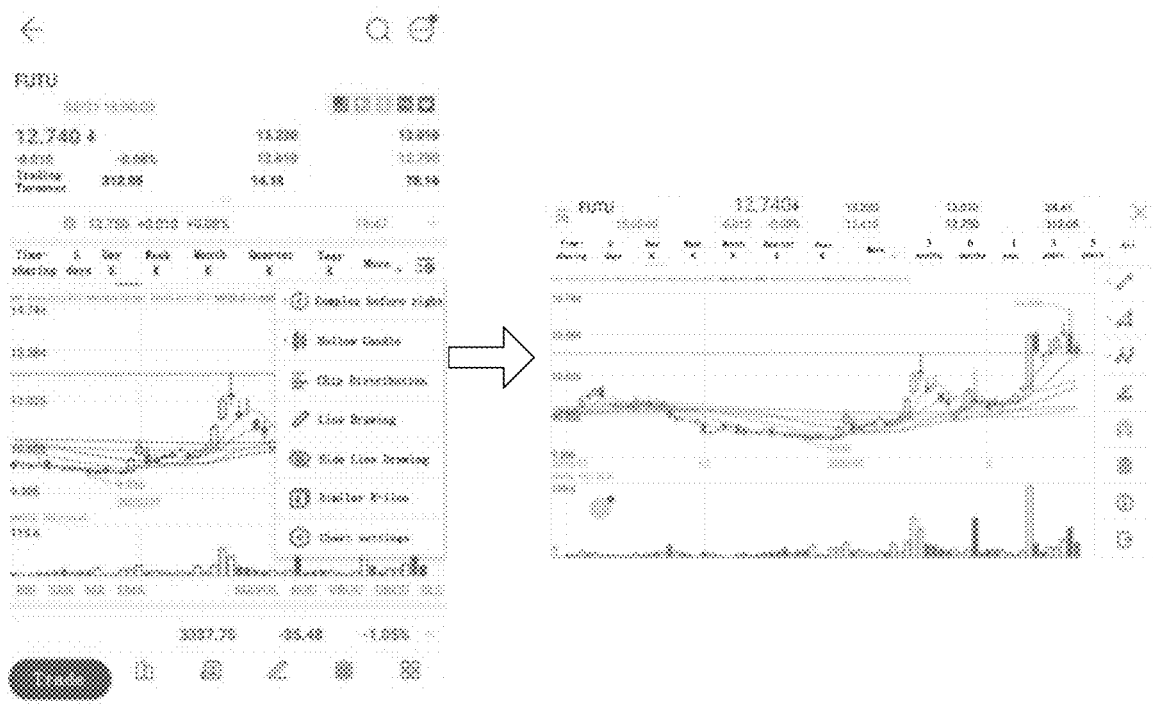
FIG. 3 is a schematic diagram illustrating a change of pages after a chart edit entry is selected according to implementations of the disclosure.

As illustrated in FIG. 2 and FIG. 3, the chart edit entry is provided in the quotation page, and the virtual button "Line Drawing" corresponding to the chart edit entry is provided in a toolbar corresponding to the main chart. In FIG. 2, the chart edit entry "Line Drawing" is used as a first-grade option button in the toolbar. In FIG. 3, after the chart edit entry "Line Drawing" is selected, switch to the second edit page from the first edit page.

Figure 4:
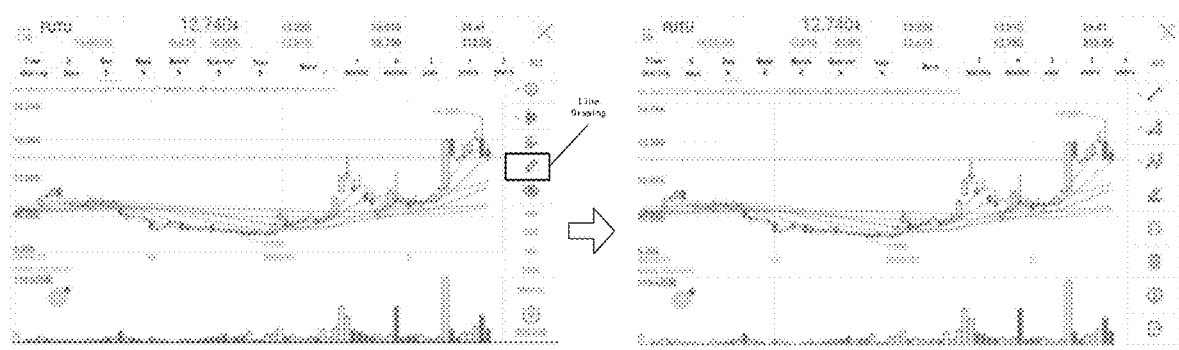
FIG. 4 is a schematic diagram illustrating a change of pages after a chart edit entry is selected according to other implementations of the disclosure.

As illustrated in FIG. 4, the chart edit entry is provided in the landscape-screen display page. In the landscape-screen display page, the virtual button "Line Drawing" is provided in the toolbar, and text "Line Drawing" is replaced with a brush-liked graph. After the chart edit entry "Line Drawing" is selected, display of the edit page (i.e., the landscape-screen display page) is maintained.

If the chart edit entry provided in the second edit page is selected, display of the second edit page is maintained. If the chart edit entry provided in the first edit page is selected, switch to the second edit page from the first edit page. During switching to the second edit page from the first edit page, an animation can be used to enhance the sensory effect of the user.

The following will further describe the reference-diagram creating operation.

Figure 5:
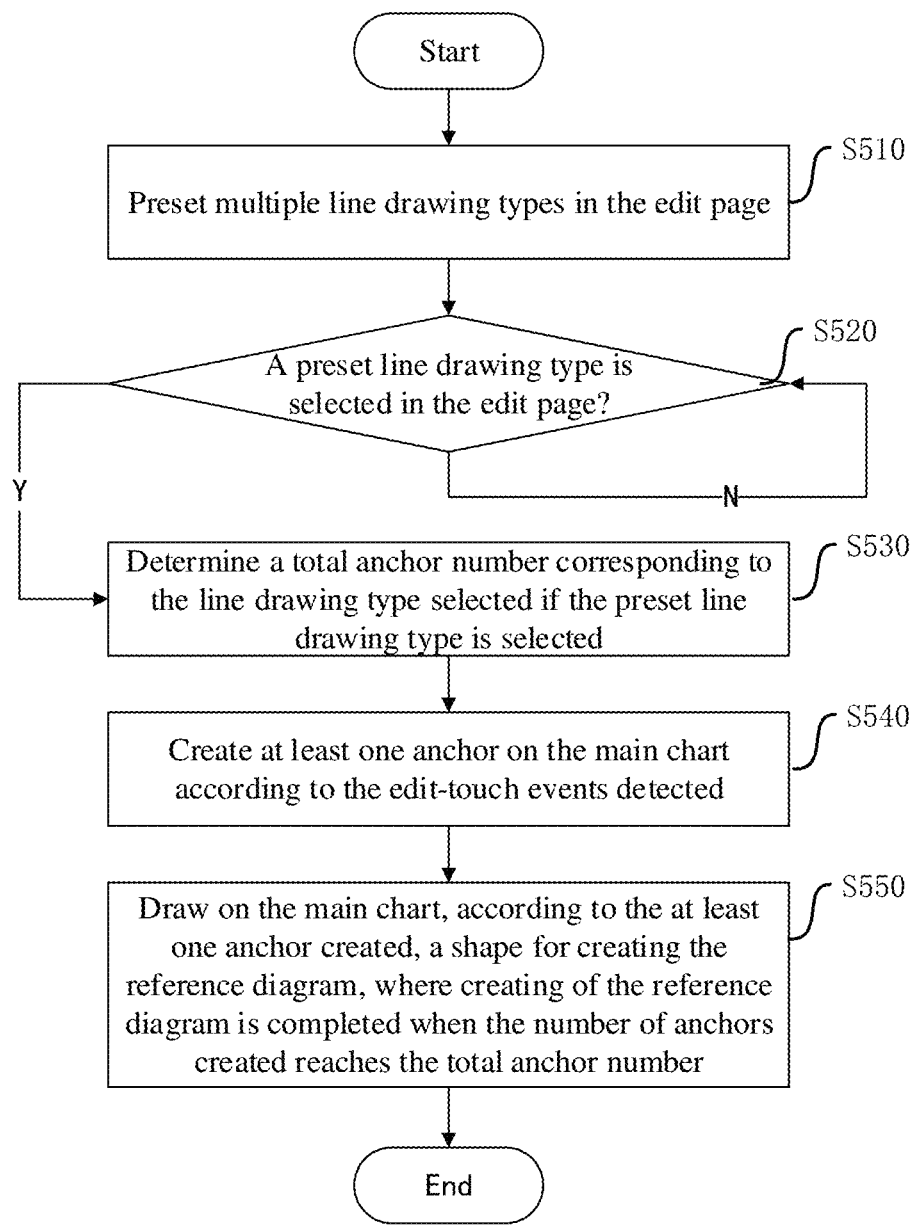
FIG. 5 is a flow chart illustrating creating a reference diagram according to implementations of the disclosure.

FIG. 5 is a flow chart illustrating creating a reference diagram according to implementations of the disclosure.

At S510, multiple line drawing types are preset in the edit page.

The multiple line drawing types include but are not limited to line segment, horizontal line segment, vertical line segment, ray, straight line, horizontal line, parallel lines, isoperiodic lines, channel lines, triangle, rectangle, parallelogram, circle, three-wave line, five-wave line, and eight-wave line.

If there are many kinds of line drawing types, in order to facilitate the user to find a required line drawing type, the multiple line drawing types can be classified into multi-grade types according to characteristics of each line drawing type. The multi-grade types include a first grade type and a second grade type. The first grade type is a parent type (a higher grade type), and the second grade type is a child type (a lower grade type) of the first grade type.

The first grade type includes but is not limited to a line segment type, a polygon type, and a wavy line type.

Figure 6:
FIG. 6 is a schematic diagram illustrating a line drawing toolbar according to implementations of the disclosure.

The second grade type of the line segment type includes line segment, horizontal line segment, vertical line segment, ray, straight line, horizontal line, parallel lines, isoperiodic lines, and channel lines. The line drawing toolbar as illustrated in FIG. 6 illustrates a menu of the first grade type and a menu of the second grade type of the line segment type.

The second grade type of the polygon type includes triangle, rectangle, parallelogram, circle, and ellipse.

The second grade type of the wavy line type includes three-wave line, five-wave line, eight-wave line, head and shoulder top, head and shoulder bottom, M-head and W-bottom, ABCD pattern, XABCD pattern, and triangle pattern.

At S520, detect in the edit page whether a preset line drawing type in the multiple line drawing types is selected. If yes, the method proceeds to an operation at S530; otherwise, the method proceeds to the operation at S520.

After the chart is switched to the editable state and before the edit-touch events are detected, detect in the edit page whether the preset line drawing type is selected.

If there is merely a first grade type, detect in the edit page whether the preset line drawing type is selected. If the preset line drawing type is selected, the line drawing type selected is displayed in a preset color. Displaying the selected line drawing type in the preset color can enable the user to obviously know the line drawing type selected.

If there are multi-grade types, detect in the edit page whether a preset lowest-grade line drawing type is selected. If the preset lowest-grade line drawing type is selected, the lowest-grade line drawing type selected is displayed in the preset color. Alternatively, menus of low-grade line drawing types are folded, only a menu of highest-grade line drawing type is displayed, and a highest-grade line drawing type corresponding to the lowest-grade line drawing type selected is displayed in the preset color.

At S530, if the preset line drawing type is selected, a total anchor number corresponding to the line drawing type selected is determined.

A total anchor number corresponding to each line drawing type can be preset. For example, line segment corresponds to two anchors, and triangle corresponds to three anchors.

After a line drawing type is selected, anchors corresponding to the line drawing type selected can be created on the main chart. The number of anchors that need to be created is equal to the total anchor number corresponding to the line drawing type selected. When all the anchors are created, a reference diagram corresponding to the line drawing type selected is created on the main chart.

At S540, at least one anchor is created on the main chart according to the edit-touch events detected.

A region outside the control region of the edit page does not support the reference-diagram editing operation, and therefore only the edit-touch event that occurs in the control region is detected.

If the touch-down event is detected in the control region, detect the touch-up event in the control region. If the touch-up event is detected in the control region, the anchor is created according to a position where the touch-up event occurs.

Furthermore, a position where the touch-down event occurs is an initial coordinate position of a touch point, and a position where the touch-up event occurs is a final coordinate position of a touch point. The final coordinate position of the touch point can be directly used as a position for creating the anchor. Alternatively, other positions closer to the position of the touch point can also be used as the position for creating the anchor. After the touch-down event is detected and before the touch-up event is detected in the control region, further detect whether the touch-move event occurs. If the touch-move event is detected, a coordinate position of the touch point is modified. The coordinate position of the touch point is a latest position where the touch-move event occurs.

In particular, the anchor is created according to the position where the touch-up event occurs as follows. The anchor is created at the position where the touch-up event occurs. Alternatively, a magnetic attraction function is used during anchor creating. That is, if the touch-up event is detected in the control region, detect whether a distance between the position where the touch-up event occurs and a preset first preset point on the main chart is less than a first distance threshold. If it is detected that the distance between the position where the touch-up event occurs and the first preset point is less than the preset first distance threshold, the anchor is created at the first preset point. The first distance threshold may be an empirical value or a value obtained through experiments, for example, the first distance threshold is a distance of 10 pixels. The first preset point refers to a preset position in the price trend chart. The preset position can be determined according to needs. For example, the first preset point is a preset candle point of a candle in the K-line chart, such as a highest point, a lowest point, an opening point, or a closing point of the candle. The magnetic attraction function can be enabled and disabled by a magnetic attraction button. In implementations, enabled and disabled states of the magnetic attraction function can be stored in the local mobile terminal or in the background server, so that the enabled and disabled states of the magnetic attraction function can be read when the edit page is opened again. When the magnetic attraction function is enabled or disabled, prompt information can be displayed in the edit page. The prompt information may be toast prompt information.

Furthermore, after the anchor is created, the created anchor is in a selected state. After a touch-down event occurs on the anchor, the selected state of the anchor is cancelled. After the selected state of the anchor is cancelled, another anchor can be created.

Furthermore, during anchor creating, if the line drawing type selected varies, the process illustrated in FIG. 5 is executed again.

At S550, according to the at least one anchor created, a shape for creating the reference diagram is drawn on the main chart, where creating of the reference diagram is completed when the number of anchors created reaches the total anchor number.

After the reference diagram is created, the created reference diagram is in a selected state, i.e., the reference-diagram modifying operation and the reference-diagram deleting operation are allowed to be performed on the reference diagram. After the touch-down event and the touch-up event occur on the reference diagram, the selected state of the created reference diagram is cancelled.

In implementations, after the reference diagram is created, the line drawing toolbar returns to an initial state, that is, a state where no line drawing type is selected. Alternatively, a continuous line-drawing function can be provided in the edit page. The continuous line-drawing function means that after the reference diagram is created, the line drawing toolbar remains the selected state, and another reference diagram will be created according to the line drawing type selected for creating the reference diagram. Furthermore, if the continuous line-drawing function is enabled, the number of anchors created during anchor creating is counted. When the number of the anchors created reaches the total anchor number corresponding to the line drawing type selected, creating of the reference diagram is completed. Thereafter, the number of the anchors created is recounted, so that when the number of anchors created reaches the total anchor number corresponding to the line drawing type selected again, creating of another reference diagram is completed.

In implementations, during anchor creating, prompt can also be conducted according to a relationship between the number of anchors that have been created and the total anchor number. In particular, when the number of the anchors created is less than the total anchor number, anchor-creation prompt information is displayed, where the anchor-creation prompt information includes at least one of: the line drawing type selected, the total anchor number, or the number of the anchors created. When the number of the anchors created is equal to the total anchor number, creation-completion prompt information is displayed. The anchor-creation prompt information and the creation-completion prompt information both can be implemented as toast prompt information.

Figure 7:
FIG. 7 is a schematic diagram illustrating anchor-creation prompt information according to implementations of the disclosure.

FIG. 7 is a schematic diagram illustrating anchor-creation prompt information according to implementations of the disclosure. Two anchors corresponding to line segment need to be created. The anchor-creation prompt information indicates that "two anchors" need to be created, and no one anchor has been created. If the continuous line-drawing function is enabled, at the beginning of creating another reference diagram, content of anchor-creation prompt information needs to be changed to the number of anchors corresponding to the another reference diagram.

In implementations, during anchor creating, deleting of the created anchor is allowed. Specifically, an anchor delete button is provided in the edit page. Upon detecting that the touch-down event occurs on the anchor, the anchor is switched to a selected state. Thereafter, if it is detected that the anchor delete button is selected, the selected anchor is deleted. In addition, after a first anchor of a reference diagram is created and the first anchor is deleted, the line drawing toolbar may be restored to the initial state. If the continuous line-drawing function is enabled, the line drawing toolbar remains the selected state, and there is no need to switch the line drawing toolbar to the initial state.

In implementations, during anchor creating, a magnifying function can be enabled to display an image within a range. In particular, if the touch-down event is detected in the control region and lasts for a first preset duration, an image within a first preset range of a position where the touch-down event occurs is enlarged by a first preset percentage and then displayed. If the touch-move event is detected in the control region, an image within a second preset range of a position where the touch-move event occurs is enlarged by a second preset percentage and then displayed. The first preset duration, the first preset percentage, the first preset range, the second preset percentage, and the second preset range are empirical values or values obtained through experiments.

The following will further describe the reference-diagram modifying operation and the reference-diagram deleting operation.

If in the control region the touch-down event is detected on a created reference diagram, the created reference diagram is switched to a selected state. After the created reference diagram is switched to the selected state, if the touch-move event is detected on the created reference diagram, a position of the created reference diagram is adjusted according to the touch-move event, and during adjusting of the position of the created reference diagram according to the touch-move event, if the touch-up event is detected on the created reference diagram, the position of the created reference diagram is fixed according to the touch-up event. After the created reference diagram is switched to the selected state, if a preset attribute modify option is selected, an attribute of the created reference diagram is modified according to the attribute modify option selected. After the created reference diagram is switched to the selected state, the created reference diagram is deleted if a preset graphic delete option is selected.

If in the control region the touch-down event is detected on an anchor of a created reference diagram, the anchor of the created reference diagram is switched to a selected state. After the anchor of the created reference diagram is switched to the selected state, if the touch-move event is detected on the anchor of the created reference diagram, a position of the anchor of the created reference diagram is adjusted according to the touch-move event, and a shape of the created reference diagram is adjusted according to the adjusted position of the anchor of the created reference diagram. During adjusting of the position of the anchor of the created reference diagram according to the touch-move event, if the touch-up event is detected on the anchor of the created reference diagram, the adjusted position of the anchor of the created reference diagram is fixed according to the touch-up event and the shape of the created reference diagram is fixed according to the fixed position of the anchor of the created reference diagram.

In particular, modifying the reference diagram includes modifying a position of the reference diagram, modifying an attribute of the reference diagram, and/or modifying a shape of the reference diagram. Furthermore, during creating of the reference diagram, the attribute of the reference diagram is a preset default attribute. By modifying the attribute of the reference diagram, the default attribute of the reference diagram can be adjusted. Modifying the shape of the reference diagram can be achieved by modifying the position of the anchor of the reference diagram.

Furthermore, a lock button can be provided in the edit page. After the lock button is selected, the position, the attribute, and/or the shape of the reference diagram are not allowed to be modified. That is, after the lock button is selected, even if the reference diagram or the anchor on the reference diagram is selected, the position, the attribute, and/or the shape of the reference diagram are not allowed to be modified.

Figure 8:
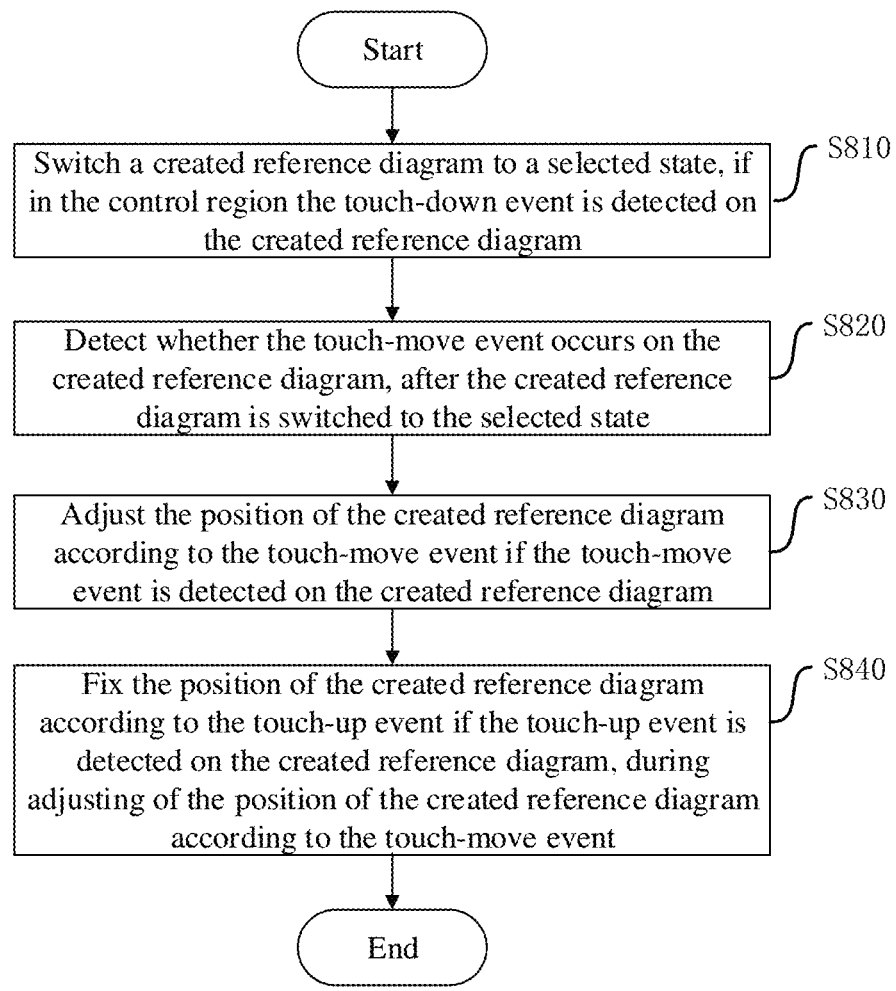
FIG. 8 is a flow chart illustrating modifying a position of a reference diagram according to implementations of the disclosure.

FIG. 8 is a flow chart illustrating modifying a position of a reference diagram according to implementations of the disclosure.

At S810, if in the control region the touch-down event is detected on the created reference diagram, the created reference diagram is switched to the selected state.

The selected state means that the created reference diagram is selected and can be edited.

Furthermore, after creating of the reference diagram is completed, the user can select the reference diagram by touching the reference diagram with a finger.

If the reference diagram is a line diagram, for example, if the reference diagram is a straight line, a ray, an ellipse, or the like, during determining whether the reference diagram is selected by touch, a distance between a touch point and a pixel on the reference diagram closest to the touch point can be calculated. If the distance is less than a preset response distance, it is determined that the touch-down event occurs on the reference diagram. The response distance is an empirical value or a value obtained through experiments.

If the reference diagram is a region diagram, for example, the reference diagram is a rectangular region, determining whether the reference diagram is selected by touch is achieved by determining whether the touch point is within a range of the region diagram according to edge coordinates of the region diagram. If the touch point is within the range of the region diagram, it is determined that the touch-down event occurs on the reference diagram.

The straight line is taken as an example of the reference diagram for illustration. The distance formula from the point to the straight line is used to calculate a distance between the touch point to the straight line. If the distance is less than the response distance, determine that the touch-down event occurs on the straight line. For a scenario where the reference diagram is a ray, reference may be made to descriptions of a scenario where the reference diagram is the straight line. That is, a boundary intersection point between the ray and the control region can be determined, and then a distance between the touch point and the ray can be calculated by calculating a distance between the touch point and a line segment between the boundary intersection point and a starting point of the ray.

For another example, the reference diagram is an ellipse. A distance between the touch point and the ellipse can be calculated according to a standard equation of the ellipse. If the distance is less than the response distance, it is determined that the touch-down event occurs on the ellipse.

For yet another example, the reference diagram is a rectangular region. In this case, it can be calculated whether the touch point is within the rectangular region, and if the touch point is within the rectangular region, it is determined that the touch-down event occurs on the rectangular region.

At S820, after the created reference diagram is switched to the selected state, detect whether the touch-move event occurs on the created reference diagram.

If it is detected that a position coordinate of a position where the touch-move event occurs (that is, the position coordinate of a touch point corresponding to the touch-move event) is located on the reference diagram, it is determined that the touch-move event occurs on the created reference diagram.

At S830, if the touch-move event is detected on the created reference diagram, the position of the created reference diagram is adjusted according to the touch-move event.

The position coordinate of the touch point corresponding to the touch-move event is detected, and the touch point corresponding to the touch-move event is in the reference diagram. The position of the reference diagram is adjusted according to a change of the position coordinate of the touch point.

At S840, during adjusting of the position of the created reference diagram according to the touch-move event, if the touch-up event is detected on the created reference diagram, the position of the created reference diagram is fixed according to the touch-up event.

A position coordinate of the touch point corresponding to the touch-up event is detected, the touch point corresponding to the touch-up event is in the reference diagram, and the position of the reference diagram is fixed to the position coordinate of the touch point corresponding to the touch-up event. Furthermore, the position coordinate of the touch point corresponding to the touch-up event is a final position coordinate of the touch point corresponding to the touch-move event.

After the position of the reference diagram is fixed and modifying of the position of the reference diagram is completed, the reference diagram is still in the selected state. When another touch-down event and touch-up event are detected on the reference diagram, the selected state of the reference diagram is cancelled.

Figure 9:
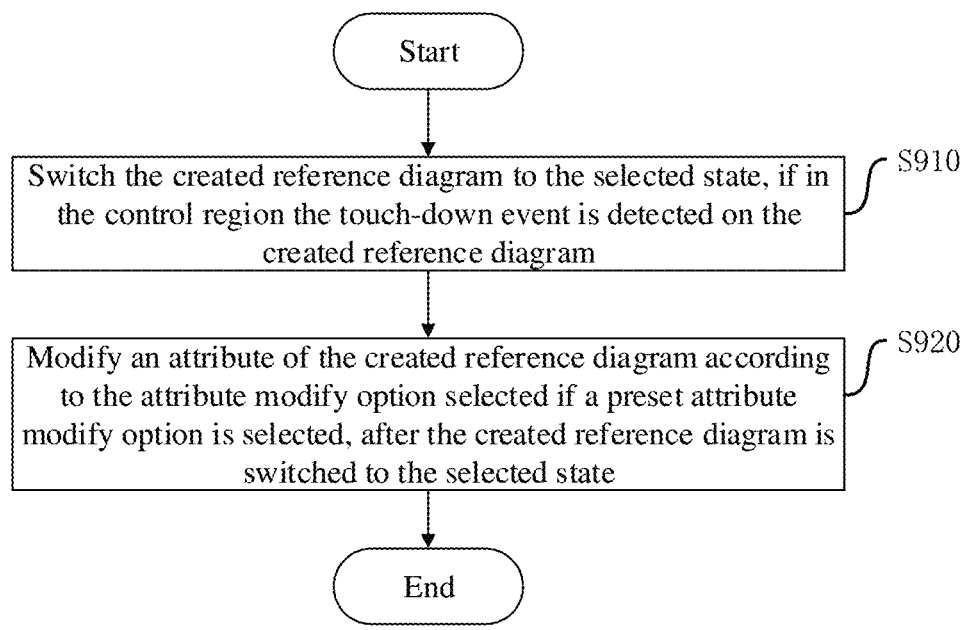
FIG. 9 is a flow chart illustrating modifying an attribute of a reference diagram according to implementations of the disclosure.

FIG. 9 is a flow chart illustrating modifying an attribute of a reference diagram according to implementations of the disclosure.

At S910, if in the control region the touch-down event is detected on the created reference diagram, the created reference diagram is switched to the selected state.

At S920, after the created reference diagram is switched to the selected state, if a preset attribute modify option is selected, an attribute of the created reference diagram is modified according to the attribute modify option selected.

The preset attribute modify option includes but is not limited to: color, thickness, and line type. The line type includes short dashed line, long dashed line, and double line.

After the attribute of the reference diagram is modified, the reference diagram is still in the selected state. When another touch-down event and touch-up event are detected on the reference diagram, the selected state of the reference diagram is cancelled.

Figure 10:
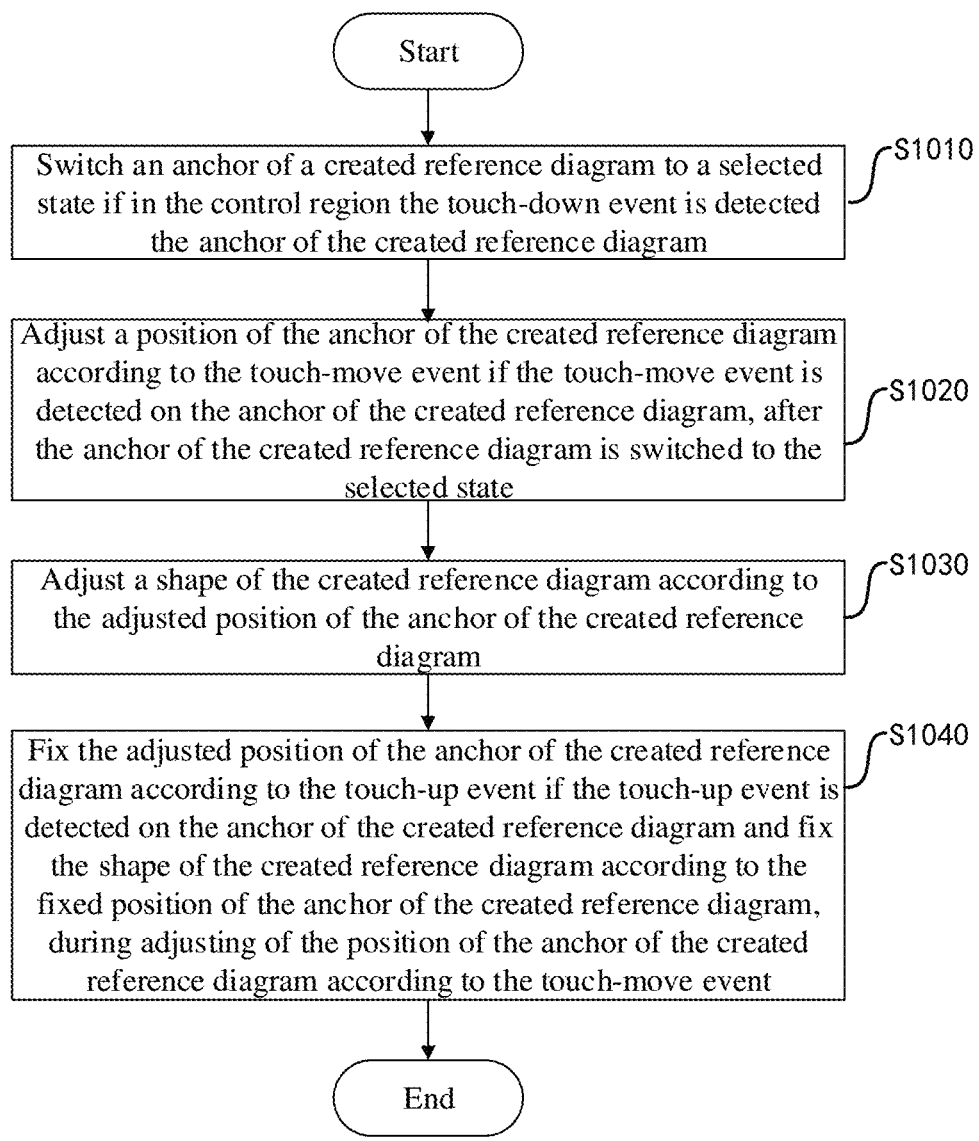
FIG. 10 is a flow chart illustrating modifying a shape of a reference diagram according to implementations of the disclosure.

FIG. 10 is a flow chart illustrating modifying a shape of a reference diagram according to implementations of the disclosure.

At S1010, if in the control region the touch-down event is detected on an anchor of a created reference diagram, the anchor of the created reference diagram is switched to a selected state.

At S1020, after the anchor of the created reference diagram is switched to the selected state, if the touch-move event is detected on the anchor of the created reference diagram, a position of the anchor of the created reference diagram is adjusted according to the touch-move event.

If it is detected that a position coordinate of a position where the touch-move event occurs (that is, the position coordinate of the touch point corresponding to the touch-move event) are located on the anchor, it is determined that the touch-move event occurs on the anchor.

During modifying of the position of the anchor, if the modified position of the anchor coincides with a position of another anchor or a distance between the modified position of the anchor and the position of the another anchor is less than a first preset distance threshold, the anchor is moved to enable a distance between the moved position of the anchor and the position of the another anchor to be greater than a second preset distance threshold. The first preset distance threshold and the second preset distance threshold are empirical values or values obtained through experiments.

At S1030, a shape of the created reference diagram is adjusted according to the adjusted position of the anchor of the created reference diagram.

Since the reference diagram consists of a continuous diagram of anchors, adjustment in the position of the anchor will lead to change in the shape of the reference diagram.

At S1040, during adjusting of the position of the anchor of the created reference diagram according to the touch-move event, if the touch-up event is detected on the anchor of the created reference diagram, the adjusted position of the anchor of the created reference diagram is fixed according to the touch-up event and the shape of the created reference diagram is fixed according to the fixed position of the anchor of the created reference diagram.

A position coordinate of the touch point corresponding to the touch-up event is detected, the touch point corresponding to the touch-up event is located on the anchor, and the position of the anchor is fixed to the position coordinate of the touch point corresponding to the touch-up event. Furthermore, the position coordinate of the touch point corresponding to the touch-up event is a final position coordinate of the touch point corresponding to the touch-move event.

In implementations, the adjusted position of the anchor of the created reference diagram is fixed according to the touch-up event as follows. The anchor of the created reference diagram is fixed at a position where the touch-up event occurs. Alternatively, a magnetic attraction function can also be enabled during adjusting of the position of the anchor. That is, detect whether a distance between the position where the touch-up event occurs and a second preset point on the main chart is less than a preset second distance threshold. If it is detected that the distance between the position where the touch-up event occurs and the second preset point is less than the preset second distance threshold, the anchor is moved to the second preset point and fixed at the second preset point. The second distance threshold is an empirical value or a value obtained through experiments. For example, the second distance threshold is a distance of 10 pixels. The second preset point refers to a preset position in the price trend chart. The preset position can be determined according to needs. For example, the second preset point is a preset candle point of a candle in the K-line chart, such as a highest point, a lowest point, an opening point, or a closing point of the candle.

In implementations, if it is detected that the touch-down event is detected on a line of a created reference diagram or on an anchor of the created reference diagram and lasts for a second preset duration, the created reference diagram or the anchor of the created reference diagram is switched to a selected state, and an image within a third preset range of a position where the touch-down event occurs is enlarged by a third preset percentage and then displayed. If it is detected that the touch-move event is detected on the line of the created reference diagram or on the anchor of the created reference diagram, an image within a fourth preset range of a position where the touch-move event occurs is enlarged by a fourth preset percentage and then displayed. When the touch-down event is detected on the line of the created reference diagram or on the anchor of the created reference diagram, the created reference diagram or the anchor of the created reference diagram is switched to the selected state. After the created reference diagram or the anchor of the created reference diagram is switched to the selected state, the created reference diagram or the anchor of the created reference diagram in the selected state is displayed in a preset manner. The second preset duration, the third preset percentage, the third preset range, the fourth preset percentage, and the fourth preset range are empirical values or values obtained through experiments. If the touch-down event is detected on the line of the created reference diagram, the reference diagram is switched to the selected state. If the touch-down event is detected on the anchor of the created reference diagram, the anchor of the created reference diagram is switched to the selected state.

Furthermore, if the created reference diagram or the anchor of the created reference diagram is selected and selecting the created reference diagram or the anchor of the created reference diagram lasts for the second preset duration, the image within the third preset range centered on the touch point is enlarged by the third preset percentage and then displayed. If the selected reference diagram or the selected anchor of the created reference diagram is dragged, an image within the fourth preset range centered on the touch point is enlarged by the fourth preset percentage and then displayed. In this way, from selecting the reference diagram or the anchor to lifting the finger (the touch-up event), the image around the touch point can be enlarged and then displayed, so that the user can better observe the situation around the touch point, to drag the selected reference diagram or the selected anchor to a suitable position.

Figure 11:
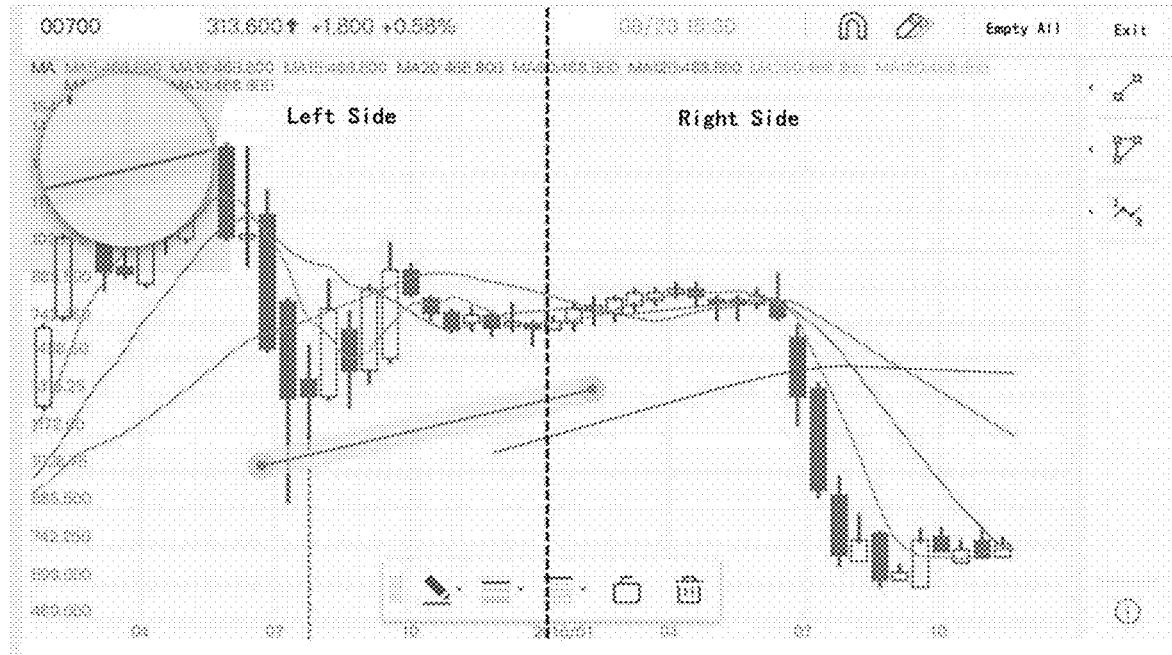
FIG. 11 is a schematic diagram illustrating enlarging an image and displaying the enlarged image according to implementations of the disclosure.

Due to limitation of the size of the screen of the mobile terminal, a magnifying display safe region can be provided, and thus the enlarged image can be displayed in the magnifying display safe region, so that the enlarged image is always not blocked by a hand of the user. For example, a display region of the screen is divided into left and right parts. If the touch point is on the left side of the screen, the right side of the screen can be determined as the magnifying display safe region, and therefore the enlarged image can be displayed on the right side of the screen. If the touch point is on the right side of the screen, the left side of the screen can be determined as the magnifying display safe region, and therefore the enlarged image can be displayed on the left side of the screen. Alternatively, if the touch point is on a division line of the left side and right side of the screen, either the left side or the right side of the screen can be determined as the magnifying display safe region. FIG. 11 is a schematic diagram illustrating enlarging an image and displaying the enlarged image according to implementations of the disclosure. The user selects a right end of a straight line in the main chart, and the right end of the straight line is located on the right side of the screen. In this case, the enlarged image can be displayed on the left side of the screen. For the manner in which the image is enlarged and displayed during creating of the reference diagram, reference may be made to that in which the image is enlarged and displayed during adjusting of the position of the anchor.

Furthermore, the created reference diagram or the anchor of the created reference diagram in the selected state is displayed in the preset manner as follows. The created reference diagram or the anchor of the created reference diagram in the selected state is displayed in a preset color. Alternatively, the created reference diagram or the anchor of the created reference diagram in the selected state is displayed along with a shadow.

After the position of the anchor is adjusted, the anchor is still in the selected state. When another touch-down event and touch-up event are detected on the anchor, the selected state of the anchor is cancelled.

In implementations, all the created reference diagrams can be deleted, or some of the created reference diagrams can be deleted.

Figure 12:
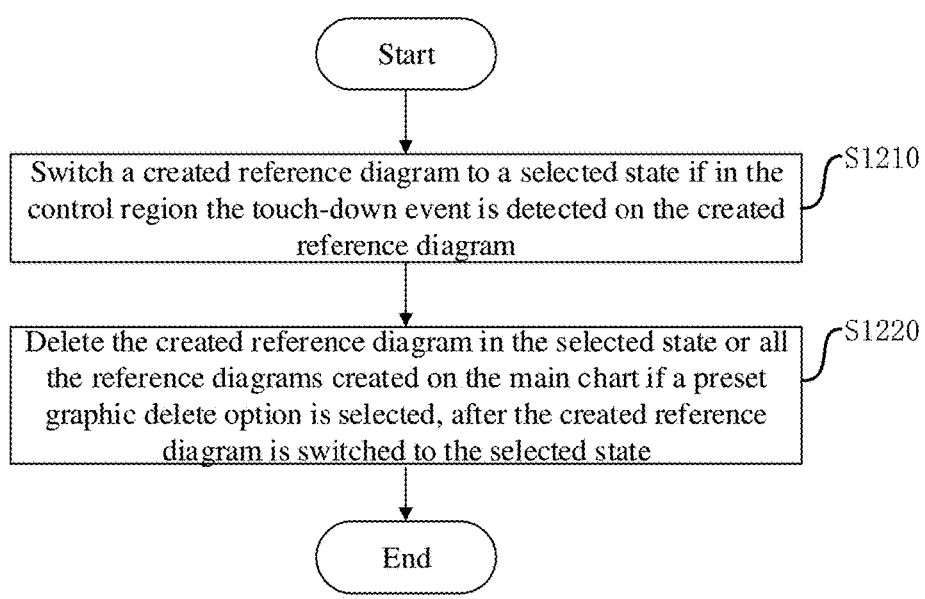
FIG. 12 is a flow chart illustrating deleting a reference diagram according to implementations of the disclosure.

FIG. 12 is a flow chart illustrating deleting a reference diagram according to implementations of the disclosure.

At S1210, if in the control region the touch-down event is detected on a created reference diagram, the created reference diagram is switched to a selected state.

At S1220, after the created reference diagram is switched to the selected state, if a preset graphic delete option is selected, the created reference diagram in the selected state is deleted.

In implementations, in addition to deleting the selected reference diagram, all the reference diagrams edited on the main chart can be deleted. A reference diagram empty button can be provided in the edit page, and if it is detected that the reference diagram empty button is selected, all the reference diagrams edited on the main chart can be deleted. The reference diagram empty button is, for example, an "Empty Canvas" button in FIG. 6 or an "Empty All" button in FIG. 7.

Furthermore, a second confirmation pop-up window is provided. The second confirmation pop-up window includes deleting prompt information, a cancel option, and a confirm option. The content of the deleting prompt information being popped up can be determined according to needs, for example, the deleting prompt information is indicative of deleting all line drawings in the current cycle. If the graphic delete option is selected, the second confirmation pop-up window is popped up. If the cancel option in the second confirmation pop-up window is selected, the selected reference diagram or all reference diagrams created on the main chart is not deleted. If the confirm option in the second confirmation pop-up window is selected, the selected reference diagram or all the reference diagrams created on the main chart is deleted.

After all the reference diagrams created on the main chart are deleted, delete-completion prompt information can be displayed on the edit page. The delete-completion prompt information may be toast prompt information.

Some examples are given below to illustrate the processes of the reference-diagram editing operation in implementations of the disclosure. After the reference-diagram editing operation is completed, the editing result can be stored to the background server, so that the editing result can be viewed when the edit page is opened again or another mobile terminal is used.

Figure 13:
FIG. 13 is a schematic diagram illustrating editing a line segment according to implementations of the disclosure.

FIG. 13 is a schematic diagram illustrating editing a line segment according to implementations of the disclosure.

The line segment corresponds to two anchors. That is, it is necessary to create two anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Automatically connect the first anchor with the second anchor, and then the line segment is created.

Figure 14:
FIG. 14 is a schematic diagram illustrating editing a ray according to implementations of the disclosure.

FIG. 14 is a schematic diagram illustrating editing a ray according to implementations of the disclosure.

The ray corresponds to two anchors. That is, it is necessary to create two anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Take the first anchor as a starting point of the ray and the second anchor as any point on the ray, and make a non-starting end of the ray extend to the boundary of the main chart to complete the creation of the ray.

Figure 15:
FIG. 15 is a schematic diagram illustrating editing a straight line according to implementations of the disclosure.

FIG. 15 is a schematic diagram illustrating editing a straight line according to implementations of the disclosure.

The straight line includes specific straight line and arbitrary straight line. The specific straight line is a horizontal straight line. The horizontal straight line corresponds to one anchor. Create an anchor in the control region and make the horizontal straight line pass through the anchor.

The arbitrary straight line is straight line other than the specific straight line. The arbitrary straight line corresponds to two anchors.

As illustrated in FIG. 15, it is necessary to create two anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Take both the first anchor and the second anchor as points on the straight line, and make both ends of the straight line extend to the boundary of the main chart to complete the creation of the straight line.

Figure 16:
FIG. 16 is a schematic diagram illustrating editing parallel lines according to implementations of the disclosure.

FIG. 16 is a schematic diagram illustrating editing parallel lines according to implementations of the disclosure.

The parallel lines correspond to three anchors. That is, it is necessary to create three anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Take both the first anchor and the second anchor as points on a first straight line and make both ends of the first straight line extend to the boundary of the main chart to complete the creation of the first straight line. Touch and click a third target position on the main chart and create a third anchor at the third target position when the finger is lifted. Take the third anchor as a point on a second straight line, and then make the second straight line parallel to the first straight line to complete the creation of the second straight line, such that the creation of the parallel lines is completed.

After a straight line of the parallel lines is switched to a selected state, the selected straight line can be dragged to adjust a distance between the two straight lines.

Figure 17:
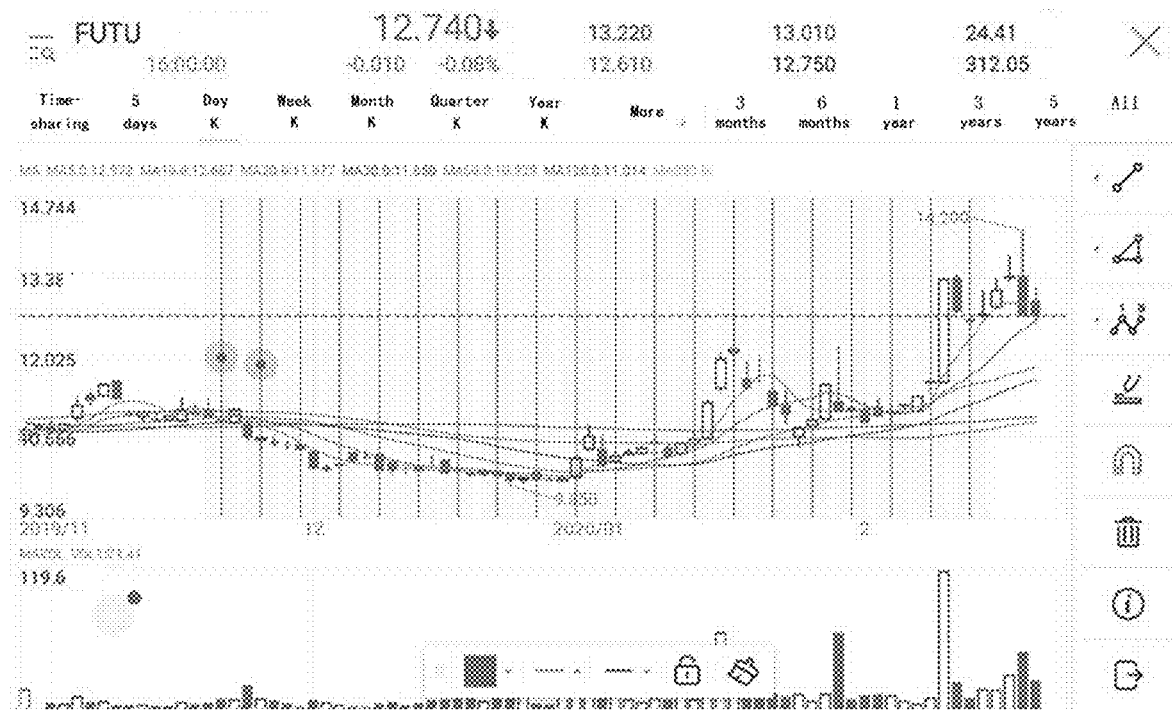
FIG. 17 is a schematic diagram illustrating editing isoperiodic lines according to implementations of the disclosure.

FIG. 17 is a schematic diagram illustrating editing isoperiodic lines according to implementations of the disclosure.

The isoperiodic lines correspond to two anchors. That is, it is necessary to create two anchors in the control region. In the control region, touch and click a first target position on the main chart, and create a first anchor at the first target position when the finger is lifted. Automatically create a first vertical straight line by taking the first anchor as a point on the first vertical straight line. Thereafter, touch and click a second target position on the main chart, and when the finger is lifted, create a second anchor at the second target position. Automatically create a second vertical straight line by taking the second anchor as a point on the second vertical straight line. Create other vertical straight lines by taking a distance between the first vertical straight line and the second vertical straight line as a periodic distance of the isoperiodic lines.

After one of the anchors is switched to a selected state, the selected anchor can be dragged to adjust a periodic distance of the isoperiodic lines.

Figure 18:
FIG. 18 is a schematic diagram illustrating editing channel lines according to implementations of the disclosure.

FIG. 18 is a schematic diagram illustrating editing channel lines according to implementations of the disclosure.

The channel lines correspond to three anchors.

That is, it is necessary to create three anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Take both the first anchor and the second anchor as points on a first straight line and make both ends of the first straight line extend to the boundary of the main chart to complete the creation of the first straight line. Touch and click a third target position on the main chart and create a third anchor at the third target position when the finger is lifted. Take the third anchor as a point on a second straight line, and make the second straight line parallel to the first straight line to complete the creation of the second straight line. Create a line symmetrical to the first straight line by using the second straight line as an axis of symmetry, to obtain a third straight line, so as to complete the creation of the channel lines.

After a straight line of the three straight lines is switched to a selected state, the selected straight line can be dragged to adjust a distance between the three straight lines. If the second straight line is dragged, a straight line corresponding to an increased distance between the straight line and the second straight line is not moved, and a position of another straight line that corresponds to a decreased distance between the another straight line and the second straight line is adjusted.

Figure 19:
FIG. 19 is a schematic diagram illustrating editing a triangle according to implementations of the disclosure.

FIG. 19 is a schematic diagram illustrating editing a triangle according to implementations of the disclosure.

The triangle corresponds to three anchors. That is, it is necessary to create three anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Connect the first anchor and the second anchor. Touch and click a third target position on the main chart and create a third anchor at the third target position when the finger is lifted. Connect the first anchor and the third anchor, and connect the second anchor and the third anchor, to complete the creation of the triangle.

Figure 20:
FIG. 20 is a schematic diagram illustrating editing a rectangle according to implementations of the disclosure.

FIG. 20 is a schematic diagram illustrating editing a rectangle according to implementations of the disclosure.

The rectangle corresponds to two anchors. That is, it is necessary to create two anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Create a rectangle by taking the first anchor and the second anchor as diagonal vertices of the rectangle.

After an anchor of the anchors is switched to a selected state, the anchor can be dragged to adjust a length and width of the rectangle.

Figures 21, 22:
FIG. 21 is a schematic diagram illustrating editing a parallelogram according to implementations of the disclosure.
FIG. 22 is a schematic diagram illustrating editing a circle according to implementations of the disclosure.

FIG. 21 is a schematic diagram illustrating editing a parallelogram according to implementations of the disclosure.

The parallelogram corresponds to three anchors. That is, it is necessary to create three anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Connect the first anchor and the second anchor to obtain a first line segment. Touch and click a third target position on the main chart and create a third anchor at the third target position when the finger is lifted. Connect the second anchor and the third anchor to obtain a second line segment. Draw a parallel line of the first line segment, and obtain a third line segment by using the third anchor as an end point of the parallel line. Draw a parallel line of the second line segment, and obtain a fourth line segment by using the first anchor as an end point of the parallel line of the second line segment. A closed figure formed by the first line segment, the second line segment, the third line segment, and the fourth line segment is the created parallelogram.

FIG. 22 is a schematic diagram illustrating editing a circle according to implementations of the disclosure.

The circle corresponds to two anchors. That is, it is necessary to create two anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Create a circle with the first anchor as a center and a distance between the first anchor and the second anchor as a radius. Alternatively, create a circle with the first anchor as a point on the circle and a distance between the first anchor and the second anchor as a diameter.

After an anchor of the anchors is switched to a selected state, the anchor can be dragged to adjust the diameter of the circle.

Figure 23:
FIG. 23 is a schematic diagram illustrating editing a three-wave line according to implementations of the disclosure.

FIG. 23 is a schematic diagram illustrating editing a three-wave line according to implementations of the disclosure.

The three-wave line corresponds to four anchors. That is, it is necessary to create four anchors in the control region. In the control region, touch and click a first target position on the main chart, and create a first anchor at the first target position when the finger is lifted. Thereafter, touch and click a second target position on the main chart, and when the finger is lifted, create a second anchor at the second target position. Connect the first anchor and the second anchor to obtain a first-wave line segment. Touch and click a third target position on the main chart and create a third anchor at the third target position when the finger is lifted. Connect the second anchor and the third anchor to obtain a second-wave line segment. Touch and click a fourth target position on the main chart and create a fourth anchor at the fourth target position when the finger is lifted. Connect the third anchor and the fourth anchor to obtain a fourth-wave line segment, so as to complete the creation of the three-wave line.

After an anchor of the anchors is switched to a selected state, the anchor can be dragged to adjust the length and angle of the line segment connected to the anchor.

The reference diagram created on the main chart can be used to analyze the shape of the main chart, so as to determine the current situation and subsequent trend of the main chart. For example, the straight line can be used as a trend line to predict a future price trend of the stock. One end of the trend line is connected to a highest stock price point and the other end of the trend line is connected to a lowest stock price point within a time period. The angle of the trend line can reflect a rising or falling trajectory of the stock price. For example, at the bottom of the stock market, the energy of short positions is gradually weakening, but the energy advantage of long positions is slowly revealed rather than suddenly increased, which may cause an arc bottom to appear in the K-line chart. In this case, a circular or elliptical reference diagram can be created to determine whether the K-line chart has an arc bottom. For another example, the three-wave line is a simplification of the eight-wave line. The three-wave line includes three-wave trends of A, B, and C. In the rising process, wave A is a first wave, wave B is a correction wave (a second wave), and wave C is a main rising wave (a third wave). According to the three-wave trends of A, B, and C, the rebound at the initial rising stage can be noted, and buy the stock at the lowest point accordingly, thereby enjoying a greater increase later.

Figure 24:
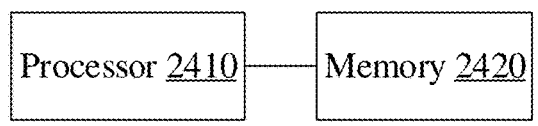
FIG. 24 is a schematic structural diagram illustrating a device for reference-diagram editing for a chart according to implementations of the disclosure.

Implementations of the disclosure provide a device for reference-diagram editing for a chart. FIG. 24 is a schematic structural diagram illustrating a device for reference-diagram editing for a chart according to implementations of the disclosure.

In implementations, the device includes but is not limited to a processor 2410 and a memory 2420.

The processor 2410 is configured to perform reference-diagram editing programs for a chart, which are stored in the memory 2420, to perform the above method. Since the method has been described in detail above, it will not be repeated herein.

Figure 25:
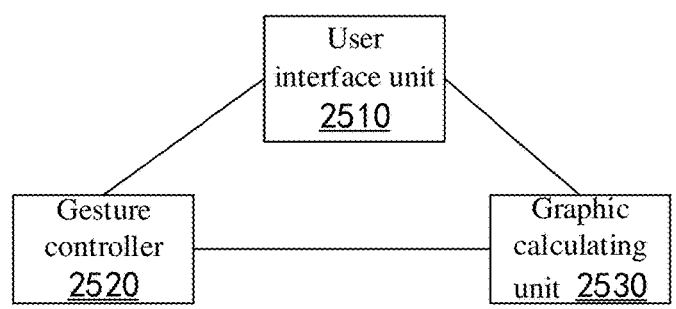
FIG. 25 is a schematic structural diagram illustrating a processor according to implementations of the disclosure.

In particular, as illustrated in FIG. 25, the processor 2410 includes a user interface (UI) unit 2510, a gesture controller 2520, and a graphic calculating unit 2530. The gesture controller 2520 and the graphic calculating unit 2530 can be separately provided or can be integrated as one unit.

The user interface unit 2510 is configured to detect whether a chart operation object is selected, during display of the chart. The user interface unit 2510 is further configured to switch the chart to an editable state upon detecting that the chart operation object is selected, and detect, after switching the chart to the editable state, a touch event that occurs in a control region of an edit page corresponding to the chart. The user interface unit 2510 is further configured to report information of the touch event to the gesture controller 2520 when the touch event is detected.

The information of the touch event includes a position coordinate of a position where the touch event occurs.

The gesture controller 2520 is configured to receive the information of the touch event reported by the user interface unit 2510, and conduct validity verification on the information of the touch event. The gesture controller 2520 is further configured to determine that a preset edit-touch event is detected in the control region if the validity verification of the information of the touch event passes, and transmit information of the edit-touch event to the graphic calculating unit 2530.

The edit page includes the control region and the chart, and the control region coincides with a region where a main chart of the chart is located.

The information of the edit-touch event includes a position coordinate of a position where the touch-event occurs.

The validity verification is conducted as follows. Determine whether the position coordinate of the position where the touch event occurs is within the control region. If the position coordinate of the position where the touch event occurs is within the control region, determine that the validity verification passes; otherwise, determine that the validity verification fails to pass.

The graphic calculating unit 2530 is configured to perform a reference-diagram editing operation on the main chart according to the edit-touch events detected, that is, to edit a reference diagram on the main chart.

The graphic calculating unit 2530 is further configured to transmit a reference diagram edited on the main chart to the user interface unit 2510. The user interface unit 2510 is further configured to receive the reference diagram edited on the main chart transmitted by the graphic calculating unit 2530 and display the reference diagram on the main chart.

Furthermore, the user interface unit 2510 is further configured to detect in the edit page whether a line drawing type is selected after switching the chart to the editable state and prior to detecting the edit-touch events. The user interface unit 2510 is further configured to determine, upon detecting that the line drawing type is selected, a total anchor number corresponding to the line drawing type selected, and transmit the total anchor number corresponding to the line drawing type selected to the graphic calculating unit 2530. The graphic calculating unit 2530 is configured to create at least one anchor on the main chart according to the edit-touch events detected, and according to the at least one anchor created, draw on the main chart a shape for creating the reference diagram. The creating of the reference diagram is completed when the number of anchors created reaches the total anchor number.

Furthermore, the edit-touch events include a touch-down event and a touch-up event. The graphic calculating unit 2530 is configured to detect the touch-up event in the control region when the touch-down event is detected in the control region, and create the anchor according to a position where the touch-up event occurs when the touch-up event is detected in the control region Furthermore, the edit-touch events further include a touch-move event. The graphic calculating unit 2530 is further configured to perform the following during the creating of the at least one anchor on the main chart according to the edit-touch events detected. The graphic calculating unit 2530 is further configured to enlarge, by a first preset percentage, an image within a first preset range of a position where the touch-down event occurs and display the enlarged image, when the touch-down event is detected in the control region and lasts for a first preset duration. The graphic calculating unit 2530 is further configured to enlarge, by a second preset percentage, an image within a second preset range of a position where the touch-move event occurs, and display the enlarged image, when the touch-move event is detected in the control region. The graphic calculating unit 2530 is configured to create the anchor at the position where the touch-up event occurs, or create the anchor at a first preset point on the main chart when a distance between the position where the touch-up event occurs and the first preset point is less than a preset first distance threshold.

Furthermore, the graphic calculating unit 2530 is configured to determine the number of anchors created and transmit the number of the anchors created to the user interface unit 2510, during the creating of the at least one anchor on the main chart according to the edit-touch events detected. The user interface unit 2510 is configured to display anchor-creation prompt information when the number of the anchors created is less than the total anchor number, and/or display creation-completion prompt information when the number of the anchors created is equal to the total anchor number. The anchor-creation prompt information includes at least one of: the line drawing type selected, the total anchor number, or the number of the anchors created.

Furthermore, the edit-touch events include a touch-down event, a touch-move event, and a touch-up event. The user interface unit 2510 is further configured to switch a created reference diagram to a selected state when the touch-down event on the created reference diagram is detected in the control region.

The user interface unit 2510 is further configured to report information of the touch-move event to the graphic calculating unit 2530 when the touch-move event is detected on the created reference diagram, after switching the created reference diagram to the selected state. The graphic calculating unit 2530 is further configured to adjust a position of the created reference diagram according to the touch-move event. The user interface unit 2510 is further configured to detect the touch-up event that will occur on the created reference diagram and report information of the touch-up event to the graphic calculating unit 2530 when the touch-up event is detected on the created reference diagram, during adjusting the position of the created reference diagram according to the touch-move event. The graphic calculating unit 2530 is further configured to fix the position of the created reference diagram according to the touch-up event. The user interface unit 2510 is further configured to modify an attribute of the created reference diagram according to a preset attribute modify option, upon detecting that the attribute modify option is selected, after switching the created reference diagram to the selected state. The user interface unit 2510 is further configured to delete the created reference diagram upon detecting that a preset graphic delete option is selected, after switching the created reference diagram to the selected state.

Furthermore, the edit-touch events include a touch-down event, a touch-move event, and a touch-up event. The user interface unit 2510 is further configured to switch an anchor of a created reference diagram to a selected state upon detecting in the control region that the touch-down event occurs on the anchor of the created reference diagram. The user interface unit 2510 is configured to report information of the touch-move event to the graphic calculating unit 2530 when the touch-move event is detected on the anchor of the created reference diagram, after switching the anchor of the created reference diagram to the selected state. The graphic calculating unit 2530 is further configured to adjust a position of the anchor of the created reference diagram according to the touch-move event and adjust a shape of the created reference diagram according to the adjusted position of the anchor of the created reference diagram. The user interface unit 2510 is further configured to report the touch-up event to the graphic calculating unit 2530 when the touch-up event is detected on the anchor of the created reference diagram, during adjusting the position of the anchor of the created reference diagram according to the touch-move event. The graphic calculating unit 2530 is further configured to fix the adjusted position of the anchor of the created reference diagram according to the touch-up event and fix the shape of the created reference diagram according to the fixed position of the anchor of the created reference diagram. The graphic calculating unit 2530 is further configured to transmit the anchor subject to position adjusting and the reference diagram subject to shape adjusting to the user interface unit 2510 for display. The adjusted position of the anchor of the created reference diagram is fixed according to the touch-up event as follows. The anchor of the created reference diagram is fixed at a position where the touch-up event occurs. Alternatively, the anchor is moved to a second preset point on the main chart and fixed at the second preset point, when a distance between the position where the touch-up event occurs and the second preset point is less than a preset second distance threshold.

Furthermore, the edit-touch event includes a touch-down event and a touch-move event. The user interface unit 2510 is further configured to perform the following during performing the reference-diagram editing operation on the main chart. The user interface unit 2510 is further configured to switch a created reference diagram or an anchor of the created reference diagram to a selected state when the touch-down event is detected on a line of the created reference diagram or on the anchor of the created reference diagram and lasts for a second preset duration, and enlarge, by a third preset percentage, an image within a third preset range of a position where the touch-down event occurs and display the enlarged image. The user interface unit 2510 is further configured to enlarge, by a fourth preset percentage, an image within a fourth preset range of a position where the touch-move event occurs, and display the enlarged image, when the touch-move event is detected on the line of the created reference diagram or on the anchor of the created reference diagram. The user interface unit 2510 is further configured to switch the created reference diagram or the anchor of the created reference diagram to the selected state when the touch-down event is detected on the line of the created reference diagram or on the anchor of the created reference diagram. The user interface unit 2510 is further configured to display in a preset manner the created reference diagram or the anchor of the created reference diagram in the selected state after switching the created reference diagram or the anchor of the created reference diagram to the selected state.

The user interface unit 2510 is further configured to upload the edited reference diagram on the main chart to the memory 2420 and/or a background server after the reference diagram is edited.

Implementations of the disclosure further provide a computer-readable storage medium. The computer-readable storage medium store one or more programs. The computer-readable storage medium may include a transitory memory, such as a random access memory. The computer-readable storage medium may also include a non-transitory memory, such as a read-only memory, a flash memory, a hard disk, or a solid-state hard disk. The computer-readable storage medium may also include a combination of the above memories. The one or more programs, when executed by one or more processors, cause the one or more processors to perform the above method. Since the method has been described in detail above, it will not be repeated herein.

The foregoing merely illustrates the implementations of the disclosure and is not intended to limit the disclosure. For those skilled in the art, various modifications and changes are allowed in the disclosure. Any modification, equivalent replacement, improvement, etc. made within the spirit and principles of the disclosure shall fall within the scope of protection of the disclosure.

What is claimed is:

1. A method for reference-diagram editing for a chart, the method being performed on a mobile terminal and comprising, during display of the chart:
    detecting whether a chart operation object is selected;
    switching the chart to an editable state in response to detecting that the chart operation object is selected;
    detecting preset edit-touch events in a control region of an edit page corresponding to the chart after switching the chart to the editable state, wherein the edit page comprises the control region and the chart, and the control region coincides with a region where a main chart of the chart, wherein a plurality of line drawing types are preset in the edit page and are classified into multi-grade types, wherein the multi-grade types comprise a first grade type as a parent type and a second grade type as a child type of the first grade type, wherein the first grade type comprises a polygon type, and the second grade type comprises triangle, rectangle, parallelogram, circle, and ellipse; and
    performing a reference-diagram editing operation on the main chart of the chart according to the edit-touch events detected in the control region of the edit page to edit a reference diagram on the main chart;
    wherein the method further comprises, subsequent to said switching the chart to the editable state and prior to said detecting the edit-touch events in the control region of the edit page:
    detecting in the edit page whether a preset line drawing type in the plurality of line drawing types is selected; and
    determining, in response to detecting that a preset line drawing type in the plurality of line drawing types is selected, a total anchor number corresponding to the line drawing type selected;
    wherein said performing the reference-diagram editing operation on the main chart of the chart according to the edit-touch events detected in the control region of the edit page comprises:
        creating at least one anchor on the main chart of the chart according to the edit-touch events detected in the control region of the edit page; and
        drawing on the main chart, based on the at least one anchor created, a shape for creating the reference diagram, wherein creating of the reference diagram is completed when a number of anchors created reaches the total anchor number; and
    wherein the method further comprises, during the creating of the at least one anchor on the main chart of the chart according to the edit-touch events detected in the control region of the edit page:
        displaying anchor-creation prompt information when the number of the anchors created is less than the total anchor number, wherein the anchor-creation prompt information comprises at least one of: the selected line drawing type, the total anchor number, or the number of the anchors created; and/or
        displaying creation-completion prompt information when the number of the anchors created is equal to the total anchor number.

2. The method of claim 1, wherein the edit-touch events comprise a touch-down event and a touch-up event, and said creating the at least one anchor on the main chart of the chart according to the edit-touch events detected in the control region of the edit page comprises:
    detecting the touch-up event in the control region of the edit page in response to detecting the touch-down event in the control region of the edit page; and
    creating the anchor according to a position where the touch-up event occurs, in response to detecting the touch-up event in the control region of the edit page.

3. The method of claim 2, wherein the edit-touch events further comprise a touch-move event, and the method further comprises, during the creating of the at least one anchor on the main chart of the chart according to the edit-touch events detected in the control region of the edit page:
    enlarging, by a first preset percentage, an image within a first preset range of a position where the touch-down event occurs and displaying the enlarged image, in response to detecting the touch-down event in the control region of the edit page and when the touch-down event lasts for a first preset duration; and/or
    enlarging, by a second preset percentage, an image within a second preset range of a position where the touch-move event occurs and displaying the enlarged image, in response to detecting the touch-move event in the control region of the edit page.

4. The method of claim 3, wherein said creating the anchor according to the position where the touch-up event occurs comprises:
creating the anchor at the position where the touch-up event occurs; or
creating the anchor at a first preset point on the main chart in response to detecting that a distance between the position where the touch-up event occurs and the first preset point is less than a first preset distance threshold.

5. The method of claim 1, wherein the edit-touch events comprise a touch-down event, a touch-move event, and a touch-up event, and said performing the reference-diagram editing operation on the main chart of the chart according to the edit-touch events detected in the control region of the edit page comprises:
in response to detecting in the control region of the edit page that the touch-down event occurs on a created reference diagram, switching the created reference diagram to a selected state; and
subsequent to said switching the created reference diagram to the selected state, adjusting a position of the created reference diagram according to the touch-move event in response to detecting that the touch-move event occurs on the created reference diagram, and during the adjusting of the position of the created reference diagram according to the touch-move event, fixing the position of the created reference diagram according to the touch-up event in response to detecting that the touch-up event occurs on the created reference diagram.

6. The method of claim 5, further comprising:
subsequent to said switching the reference diagram to the selected state, modifying an attribute of the created reference diagram according to a preset attribute modify option in response to detecting that the preset attribute modify option is selected; and/or
subsequent to said switching the reference diagram to the selected state, deleting the created reference diagram in response to detecting that a preset graphic delete option is selected.

7. The method of claim 1, wherein the edit-touch events comprise a touch-down event, a touch-move event, and a touch-up event, and said performing the reference-diagram editing operation on the main chart of the chart according to the edit-touch events detected in the control region of the edit page comprises:
in response to detecting that the touch-down event occurs on an anchor of a created reference diagram, switching the anchor to a selected state;
subsequent to said switching the anchor to the selected state, in response to detecting that the touch-move event occurs on the anchor, adjusting a position of the anchor according to the touch-move event and adjusting a shape of the created reference diagram where the anchor is located according to the adjusted position of the anchor; and
in response to detecting the touch-up event on the anchor during the adjusting of the position of the anchor according to the touch-move event, fixing the adjusted position of the anchor according to the touch-up event and fixing the shape of the created reference diagram where the anchor is located according to the fixed position of the anchor of the created reference diagram.

8. The method of claim 7, wherein said fixing the adjusted position of the anchor according to the touch-up event comprises:
fixing the anchor at a position where the touch-up event occurs; or
moving the anchor to a preset point on the main chart and fixing the anchor at the preset point in response to detecting that a distance between the position where the touch-up event occurs and the preset point is less than a preset distance threshold.

9. The method of claim 1, wherein the edit-touch events comprise a touch-down event and a touch-move event, and the method further comprises, during the performing of the reference-diagram editing operation on the main chart of the chart:
in response to detecting that the touch-down event occurs on a line or an anchor of a created reference diagram and lasts for a second preset duration, switching the created reference diagram or the anchor where the touch-down event occurs to a selected state, and enlarging, by a first preset percentage, an image within a first preset range of a position where the touch-down event occurs and displaying the enlarged image; and/or
in response to detecting that the touch-move event occurs on the line of the created reference diagram or on the anchor of the created reference diagram, enlarging, by a second preset percentage, an image within a second preset range of a position where the touch-move event occurs and displaying the enlarged image; and/or
in response to detecting that the touch-down event occurs on the line of the created reference diagram or on the anchor of the created reference diagram, switching the created reference diagram or the anchor to the selected state, and subsequent to said switching the created reference diagram or the anchor to the selected state, displaying, in a preset display manner, the created reference diagram or the anchor in the selected state.

10. A device for reference-diagram editing for a chart, the device comprising:
a memory;
a processor; and
a computer program stored on the memory and executable on the processor,
wherein the computer program, when executed by the processor, causes the processor to:
detect whether a chart operation object is selected;
switch the chart to an editable state in response to detecting that the chart operation object is selected;
detect preset edit-touch events in a control region of an edit page corresponding to the chart after switching the chart to the editable state, wherein the edit page comprises the control region and the chart, and the control region coincides with a region where a main chart of the chart, wherein a plurality of line drawing types are preset in the edit page and are classified into multi-grade types, wherein the multi-grade types comprise a first grade type as a parent type and a second grade type as a child type of the first grade type, wherein the first grade type comprises a polygon type, and the second grade type comprises triangle, rectangle, parallelogram, circle, and ellipse; and
perform a reference-diagram editing operation on the main chart of the chart according to the edit-touch events detected in the control region of the edit page to edit a reference diagram on the main chart;
wherein the computer program, when executed by the processor, further causes the processor to:
subsequent to said switching the chart to the editable state and prior to said detecting the edit-touch events in the control region of the edit page, detect in the edit page whether a preset line drawing type in the plurality of line drawing types is selected; and determine, in response to detecting that a preset line drawing type in the plurality of line drawing types is selected, a total anchor number corresponding to the line drawing type selected;

wherein the computer program executed by the processor to perform the reference-diagram editing operation on the main chart of the chart according to the edit-touch events detected in the control region of the edit page is executed by the processor to:

create at least one anchor on the main chart of the chart according to the edit-touch events detected in the control region of the edit page; and draw on the main chart, based on the at least one anchor created, a shape for creating the reference diagram, wherein creating of the reference diagram is completed when a number of anchors created reaches the total anchor number; and wherein the computer program, when executed by the processor, further causes the processor to, during the creating of the at least one anchor on the main chart of the chart according to the edit-touch events detected in the control region of the edit page:

display anchor-creation prompt information when the number of the anchors created is less than the total anchor number, wherein the anchor-creation prompt information comprises at least one of: the selected line drawing type, the total anchor number, or the number of the anchors created; and/or display creation-completion prompt information when the number of the anchors created is equal to the total anchor number.

11. The device of claim 10, wherein the edit-touch events comprise a touch-down event and a touch-up event, and the computer program executed by the processor to create the at least one anchor on the main chart of the chart according to the edit-touch events detected in the control region of the edit page is executed by the processor to:

detect the touch-up event in the control region of the edit page in response to detecting the touch-down event in the control region of the edit page; and create the anchor according to a position where the touch-up event occurs, in response to detecting the touch-up event in the control region of the edit page.

12. The device of claim 11, wherein the edit-touch events further comprise a touch-move event, and the computer program, when executed by the processor, further causes the processor to, during the creating of the at least one anchor on the main chart of the chart according to the edit-touch events detected in the control region of the edit page:

enlarge, by a first preset percentage, an image within a first preset range of a position where the touch-down event occurs and display the enlarged image, in response to detecting the touch-down event in the control region of the edit page and when the touch-down event lasts for a first preset duration; and/or enlarge, by a second preset percentage, an image within a second preset range of a position where the touch-move event occurs and display the enlarged image, in response to detecting the touch-move event in the control region of the edit page.

13. The device of claim 12, wherein the computer program executed by the processor to create the anchor according to the position where the touch-up event occurs is executed by the processor to:

create the anchor at the position where the touch-up event occurs; or create the anchor at a first preset point on the main chart in response to detecting that a distance between the position where the touch-up event occurs and the first preset point is less than a first preset distance threshold.

14. The device of claim 10, wherein the edit-touch events comprise a touch-down event, a touch-move event, and a touch-up event, and the computer program executed by the processor to perform the reference-diagram editing operation on the main chart of the chart according to the edit-touch events detected in the control region of the edit page is executed by the processor to:

in response to detecting in the control region of the edit page that the touch-down event occurs on a created reference diagram, switch the created reference diagram to a selected state; and subsequent to said switching the created reference diagram to the selected state, adjust a position of the created reference diagram according to the touch-move event in response to detecting that the touch-move event occurs on the created reference diagram, and during the adjusting of the position of the created reference diagram according to the touch-move event, fix the position of the created reference diagram according to the touch-up event in response to detecting that the touch-up event occurs on the created reference diagram.

15. The device of claim 14, wherein the computer program, when executed by the processor, further causes the processor to:

subsequent to said switching the reference diagram to the selected state, modify an attribute of the created reference diagram according to a preset attribute modify option in response to detecting that the preset attribute modify option is selected; and/or subsequent to said switching the reference diagram to the selected state, delete the created reference diagram in response to detecting that a preset graphic delete option is selected.

16. A non-transitory computer-readable storage medium having computer programs for reference-diagram editing for a chart stored thereon, wherein the computer programs, when executed by a processor, cause the processor to:

detect whether a chart operation object is selected;

switch the chart to an editable state in response to detecting that the chart operation object is selected;

detect preset edit-touch events in a control region of an edit page corresponding to the chart after switching the chart to the editable state, wherein the edit page comprises the control region and the chart, and the control region coincides with a region where a main chart of the chart, wherein a plurality of line drawing types are preset in the edit page and are classified into multi-grade types, wherein the multi-grade types comprise a first grade type as a parent type and a second grade type as a child type of the first grade type, wherein the first grade type comprises a polygon type, and the second grade type comprises triangle, rectangle, parallelogram, circle, and ellipse; and perform a reference-diagram editing operation on the main chart of the chart according to the edit-touch events detected in the control region of the edit page to edit a reference diagram on the main chart;

wherein the computer programs, when executed by the processor, further cause the processor to:

subsequent to said switching the chart to the editable state and prior to said detecting the edit-touch events in the control region of the edit page,
  detect in the edit page whether a preset line drawing type in the plurality of line drawing types is selected; and
  determine, in response to detecting that a preset line drawing type in the plurality of line drawing types is selected, a total anchor number corresponding to the line drawing type selected;
wherein the computer programs executed by the processor to perform the reference-diagram editing operation on the main chart of the chart according to the edit-touch events detected in the control region of the edit page are executed by the processor to:
  create at least one anchor on the main chart of the chart according to the edit-touch events detected in the control region of the edit page; and
  draw on the main chart, based on the at least one anchor created, a shape for creating the reference diagram, wherein creating of the reference diagram is completed when a number of anchors created reaches the total anchor number; and
wherein the computer programs, when executed by the processor, further cause the processor to, during the creating of the at least one anchor on the main chart of the chart according to the edit-touch events detected in the control region of the edit page:
  display anchor-creation prompt information when the number of the anchors created is less than the total anchor number, wherein the anchor-creation prompt information comprises at least one of: the selected line drawing type, the total anchor number, or the number of the anchors created; and/or
  display creation-completion prompt information when the number of the anchors created is equal to the total anchor number.

17. The non-transitory computer-readable storage medium of claim 16, wherein the edit-touch events comprise a touch-down event and a touch-up event, and the computer programs executed by the processor to create the at least one anchor on the main chart of the chart according to the edit-touch events detected in the control region of the edit page are executed by the processor to:
  detect the touch-up event in the control region of the edit page in response to detecting the touch-down event in the control region of the edit page; and
  create the anchor according to a position where the touch-up event occurs, in response to detecting the touch-up event in the control region of the edit page.

18. The non-transitory computer-readable storage medium of claim 16, wherein the edit-touch events comprise a touch-down event, a touch-move event, and a touch-up event, and the computer programs executed by the processor to perform the reference-diagram editing operation on the main chart of the chart according to the edit-touch events detected in the control region of the edit page are executed by the processor to:
  in response to detecting in the control region of the edit page that the touch-down event occurs on a created reference diagram, switch the created reference diagram to a selected state; and
  subsequent to said switching the created reference diagram to the selected state, adjust a position of the created reference diagram according to the touch-move event in response to detecting that the touch-move event occurs on the created reference diagram, and during the adjusting of the position of the created reference diagram according to the touch-move event, fix the position of the created reference diagram according to the touch-up event in response to detecting that the touch-up event occurs on the created reference diagram.

19. The non-transitory computer-readable storage medium of claim 16, wherein the edit-touch events comprise a touch-down event, a touch-move event, and a touch-up event, and the computer programs executed by the processor to perform the reference-diagram editing operation on the main chart of the chart according to the edit-touch events detected in the control region of the edit page are executed by the processor to:
  in response to detecting that the touch-down event occurs on an anchor of a created reference diagram, switch the anchor to a selected state;
  subsequent to said switching the anchor to the selected state, in response to detecting that the touch-move event occurs on the anchor, adjust a position of the anchor according to the touch-move event and adjust a shape of the created reference diagram where the anchor is located according to the adjusted position of the anchor; and
  in response to detecting the touch-up event on the anchor during the adjusting of the position of the anchor according to the touch-move event, fix the adjusted position of the anchor according to the touch-up event and fix the shape of the created reference diagram where the anchor is located according to the fixed position of the anchor of the created reference diagram.

20. The non-transitory computer-readable storage medium of claim 16, wherein the edit-touch events comprise a touch-down event and a touch-move event, and the computer programs, when executed by the processor, further cause the processor to:
  during the performing of the reference-diagram editing operation on the main chart of the chart,
    in response to detecting that the touch-down event occurs on a line or an anchor of a created reference diagram and lasts for a second preset duration, switch the created reference diagram or the anchor where the touch-down event occurs to a selected state, and enlarge, by a first preset percentage, an image within a first preset range of a position where the touch-down event occurs and displaying the enlarged image; and/or
    in response to detecting that the touch-move event occurs on the line of the created reference diagram or on the anchor of the created reference diagram, enlarge, by a second preset percentage, an image within a second preset range of a position where the touch-move event occurs and displaying the enlarged image; and/or
    in response to detecting that the touch-down event occurs on the line of the created reference diagram or on the anchor of the created reference diagram, switch the created reference diagram or the anchor to the selected state, and subsequent to said switching the created reference diagram or the anchor to the selected state, display, in a preset display manner, the created reference diagram or the anchor in the selected state.

* * * * *